US008095866B2

(12) United States Patent
Folting et al.

(10) Patent No.: US 8,095,866 B2
(45) Date of Patent: Jan. 10, 2012

(54) FILTERING USER INTERFACE FOR A DATA SUMMARY TABLE

(75) Inventors: Allan Folting, Redmond, WA (US); Thibaut Vial, Seattle, WA (US); Robert Hawking, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 11/223,631

(22) Filed: Sep. 9, 2005

(65) Prior Publication Data

US 2007/0061746 A1    Mar. 15, 2007

(51) Int. Cl.
*G06N 3/00* (2006.01)
(52) U.S. Cl. ........................................ 715/212
(58) Field of Classification Search .............. 715/212, 715/780, 825, 843, 234, 243, 254
See application file for complete search history.

(56) References Cited

U.S. PATENT DOCUMENTS

| | | | | |
|---|---|---|---|---|
| 5,566,330 | A | * | 10/1996 | Sheffield .......................... 707/4 |
| 5,787,411 | A | * | 7/1998 | Groff et al. ....................... 707/2 |
| 5,966,716 | A | | 10/1999 | Comer et al. |
| 6,026,397 | A | | 2/2000 | Sheppard ......................... 707/5 |
| 6,078,924 | A | * | 6/2000 | Ainsbury et al. ............. 707/101 |
| 6,246,410 | B1 | | 6/2001 | Bergeron et al. |
| 6,279,016 | B1 | * | 8/2001 | De Vorchik et al. .......... 715/210 |
| 6,411,313 | B1 | | 6/2002 | Conlon et al. |
| 6,453,270 | B1 | | 9/2002 | Durbin |
| 6,507,836 | B1 | * | 1/2003 | Nose et al. ........................ 707/3 |
| 6,604,095 | B1 | | 8/2003 | Cesare et al. |
| 6,626,959 | B1 | | 9/2003 | Moise et al. |
| 6,829,615 | B2 | | 12/2004 | Schirmer et al. |
| 6,839,719 | B2 | | 1/2005 | Wallace |
| 6,906,717 | B2 | | 6/2005 | Couckuyt et al. |
| 6,988,241 | B1 | | 1/2006 | Guttman et al. |
| 7,073,133 | B2 | * | 7/2006 | Hughes et al. ................ 715/765 |
| 7,130,812 | B1 | | 10/2006 | Iyer et al. |
| 7,143,339 | B2 | * | 11/2006 | Weinberg et al. ............. 715/212 |
| 7,188,169 | B2 | | 3/2007 | Buus et al. |
| 7,480,675 | B2 | | 1/2009 | Folting |
| 2002/0013786 | A1 | | 1/2002 | Machalek |
| 2002/0038217 | A1 | | 3/2002 | Young |
| 2002/0049687 | A1 | | 4/2002 | Helsper et al. |
| 2002/0054141 | A1 | * | 5/2002 | Yen et al. ....................... 345/804 |
| 2002/0116417 | A1 | | 8/2002 | Weinberg et al. |

(Continued)

FOREIGN PATENT DOCUMENTS

| | | |
|---|---|---|
| KR | 2004/27270 A | 4/2004 |
| KR | 10-2004-0048786 A | 6/2004 |
| KR | 2004-106278 A | 12/2004 |
| KR | 2005-77048 A | 8/2005 |
| WO | WO 02/063876 A1 | 8/2002 |

OTHER PUBLICATIONS

Balter, Alison, "Alison Batter's Mastering Microsoft(r) Office Access 2003," Sams, Dec. 8, 2003, pp. 68-72.*

(Continued)

*Primary Examiner* — Kyle Stork
(74) *Attorney, Agent, or Firm* — Merchant & Gould P.C.

(57) ABSTRACT

A graphical user interface for creating a data summary table includes a data summary table including a plurality of fields, and a filtering pane programmed to apply filters to items in the fields of the data summary table, the filtering pane including a field selector control, wherein the field selector control is programmed to allow for selection of a field of the fields in the data summary table to define filtering for the field.

20 Claims, 28 Drawing Sheets

U.S. PATENT DOCUMENTS

| | | | |
|---|---|---|---|
| 2002/0120604 A1* | 8/2002 | Labarge et al. | 707/1 |
| 2003/0225876 A1 | 12/2003 | Oliver | |
| 2004/0268237 A1* | 12/2004 | Jones et al. | 715/513 |
| 2005/0039033 A1* | 2/2005 | Meyers et al. | 713/193 |
| 2005/0071737 A1 | 3/2005 | Adendorff et al. | |
| 2005/0154769 A1 | 7/2005 | Eckart | |
| 2005/0192825 A1 | 9/2005 | Cardno et al. | |
| 2005/0210001 A1* | 9/2005 | Lee | 707/3 |
| 2005/0216831 A1 | 9/2005 | Guzik et al. | |
| 2006/0075328 A1 | 4/2006 | Becker et al. | |
| 2006/0095276 A1 | 5/2006 | Axelrod et al. | |
| 2006/0167704 A1 | 7/2006 | Nicholls | |
| 2006/0224568 A1* | 10/2006 | Debrito | 707/3 |
| 2006/0287998 A1 | 12/2006 | Folting et al. | |
| 2007/0061369 A1 | 3/2007 | Folting et al. | |
| 2007/0074130 A1 | 3/2007 | Folting et al. | |
| 2007/0174228 A1 | 7/2007 | Folting et al. | |

OTHER PUBLICATIONS

U.S. Appl. No. 11/157,634, filed Jun. 21, 2005 and entitled "Dynamically Filtering Aggregate Reports based on Values resulting from One or More Previously Applied Filters," 24 pages and 11 drawing sheets.

Microsoft Office Assistance: Pivot Table reports 101; http://office.Microsoft.com/en-us/assistance/HA010346321033.aspx?mode=print, © 2005 Microsoft Corporation, 11 pages (printed Aug. 10, 2005).

Carlton Collins, Microsoft Business Solutions, Microsoft Excel Pivot Tables, "A Business Software Tip," http/www.microsoft.com/businesssolutions/excel_pivot_tables_Collins.mspx?pf=true, 13 pages, updated Jun. 3, 2005 (printed Aug. 10, 2005).

Search Report for PCT/US2006/033807, mailed Jan. 11, 2007, 3 pages.

Search Report and Written Opinion for PCT/US2006/033876, mailed Feb. 16, 2007, 10 pages.

Data Palette, Wikipedia, Oct. 2007, 1 page.

Search Report for PCT/US2006/033807, mailed Jan. 9, 2007, 3 pages.

Search Report for PCT/US2006/033808, mailed Jan. 11, 2007, 3 pages.

European Search Report for EP 06790086.0, mailed Nov. 17, 2008, 6 pages.

* cited by examiner

FIG. 2

| | A | B | C | D | E | F | G | |
|---|---|---|---|---|---|---|---|---|
| 1 | Customer Name | Group | Country | Region | State | City | Postal Code | Product |
| 2 | Christy Zhu | Pacific | Australia | Australia | New South Wales | North Ryde | 2113 | Bikes |
| 3 | Ruben Prasad | North America | United States | Southwest | California | Beverly Hills | 90210 | Bikes |
| 4 | Cole A Watson | North America | Canada | Canada | British Columbia | Metchosin | V9 | Bikes |
| 5 | Sydney S Wright | North America | United States | Northwest | Oregon | Lebanon | 97355 | Bikes |
| 6 | Rachael M Martinez | Europe | France | France | Seine Saint Denis | Pantin | 93500 | Bikes |
| 7 | Julio Ruiz | Pacific | Australia | Australia | Queensland | East Brisbane | 4169 | Bikes |
| 8 | Curtis Lu | Pacific | Australia | Australia | Queensland | East Brisbane | 4169 | Bikes |
| 9 | Albert R Alvarez | Pacific | Australia | Australia | South Australia | Perth | 6006 | Bikes |
| 10 | Colin G Anand | North America | United States | Southwest | California | Coronado | 92118 | Bikes |
| 11 | Martha C Xu | Pacific | Australia | Australia | Queensland | Rockhampton | 4700 | Bikes |
| 12 | Katrina M Raji | Pacific | Australia | Australia | New South Wales | Wollongong | 2500 | Bikes |
| 13 | Brad D Deng | Europe | United Kingdom | United Kingdom | England | Scotland | TD1 3HE | Bikes |
| 14 | Emma W Brown | North America | United States | Southwest | California | Lemon Grove | 91945 | Bikes |
| 15 | Edward Brown | North America | United States | Southwest | California | Santa Monica | 90401 | Bikes |
| 16 | Abigail R Henderson | Europe | Germany | Germany | Nordrhein-Westfalen | Werne | 59368 | Bikes |
| 17 | Courtney A Edwards | North America | United States | Northwest | Oregon | Milwaukie | 97222 | Bikes |
| 18 | Latasha A Alonso | Europe | United Kingdom | United Kingdom | England | York | YO3 4TN | Bikes |
| 19 | Warren S Jai | Pacific | Australia | Australia | Victoria | Melbourne | 3000 | Bikes |
| 20 | Jonathon R Gutierrez | Pacific | Australia | Australia | New South Wales | Goulburn | 2580 | Bikes |
| 21 | Alexandra H Watson | Pacific | Australia | Australia | New South Wales | Goulburn | 2580 | Bikes |
| 22 | Sydney C Rogers | North America | United States | Southwest | California | Burbank | 91502 | Bikes |
| 23 | Melanie Sanchez | Europe | Germany | Germany | Bayern | Ingolstadt | 85049 | Bikes |
| 24 | Louis B Xie | Europe | United Kingdom | United Kingdom | England | York | YO24 1GF | Bikes |
| 25 | Lucas Hill | North America | United States | Southwest | California | Berkeley | 94704 | Bikes |
| 26 | Kevin Gonzalez | North America | United States | Northwest | Washington | Kirkland | 98033 | Bikes |
| 27 | Albert W Blanco | Europe | United Kingdom | United Kingdom | England | Esher-Molesey | EM15 | Bikes |
| 28 | Bonnie C Xu | North America | United States | Northwest | Washington | Bremerton | 98312 | Bikes |
| 29 | Misty Raji | Pacific | Australia | Australia | Victoria | Bendigo | 3550 | Bikes |
| 30 | Anne Dominguez | Europe | Germany | Germany | Hessen | Kassel | 34117 | Bikes |
| 31 | Kelvin Huang | North America | United States | Southwest | California | Bellflower | 90706 | Bikes |
| 32 | Logan Gonzales | Pacific | Australia | Australia | Queensland | Brisbane | 4000 | Bikes |

200, 210, 205

745

- Remove Filter

Equals...
Does Not Equal...

Greater Than...
Greater Than Or Equal To...
Less Than...
[✓] Less Than Or Equal To...

Between...
Not Between...

Top 10...

830

```
Manual filters
Year: 2000, 2001, 2002, 2003, 2004

Text filters
Product Name: Contains 'Ab'

Number filters (in order)
1. Product Family: Top 10 by Profit
2. Aircraft: Store Sales is greater than 10,000,000

AutoSort
Aircraft: Descending (Z to A) by Profit
Region: Ascending (A to Z)
```

FILTERING USER INTERFACE FOR A DATA SUMMARY TABLE

RELATED APPLICATIONS

This application is related to U.S. patent application Ser. No. 11/222,660, filed on even date herewith and entitled "Automated Placement of Fields in a Data Summary Table," and U.S. patent application Ser. No. 11/223,527, filed on even date herewith and entitled "User Interface for Creating a Spreadsheet Data Summary Table," the entireties of which are hereby incorporated by reference.

BACKGROUND

Data summary tables can be used to analyze large amounts of data. One example of a data summary table is PIVOT-TABLE dynamic views that can be generated using Microsoft Corporation's EXCEL spreadsheet software. A data summary table provides an efficient way to display and summarize data that is supplied by a database program or that is in a data listing of a spreadsheet. A user can select fields of the data to include within page, row, column, or data regions of the data summary table and can choose parameters such as the sum, variance, count, and standard deviation to be displayed for selected data fields. Data in a database that can be queried from within a spreadsheet program, or spreadsheet data including lists, can be analyzed in a data summary table.

Although a data summary table is designed so that data can be efficiently and intuitively analyzed, creation of the data summary table itself can be challenging for novice users. For example, some programs provide wizards that assist the user in creating a data summary table. While these wizards may be helpful in creating an initial data summary table, the wizards cannot easily be used to modify the display once it is created. Other programs allow users to drag and drop desired fields directly onto the data summary table. While these programs provide the user with greater flexibility when creating the display, such programs can be less intuitive for a novice to use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one aspect, a graphical user interface for creating a data summary table includes a data summary table including a plurality of fields, and a filtering pane programmed to apply filters to items in the fields of the data summary table, the filtering pane including a field selector control, wherein the field selector control is programmed to allow for selection of a field of the fields in the data summary table to define filtering for the field.

According to another aspect, in a computer system having a graphical user interface for a data summary table, a method includes: allowing selection of a field from a plurality of fields; presenting filtering options for the field; associating selected filtering with the field; and thereafter, applying the selected filtering to items in the field when the field is added to a data summary table.

According to another aspect, a computer-readable medium has computer-executable instructions for performing steps including: allowing selection of a field from a plurality of fields; presenting filtering options for the field; associating selected filtering with the field; and thereafter, applying the selected filtering to items in the field when the field is added to a data summary table.

BRIEF DESCRIPTION OF THE DRAWINGS

Reference will now be made to the accompanying drawings, which are not necessarily drawn to scale, and wherein:

FIG. 2 illustrates an example sheet of a spreadsheet program;

DETAILED DESCRIPTION

Embodiments will now be described more fully hereinafter with reference to the accompanying drawings. Embodiments disclosed herein are examples and should not be construed as limiting; rather, these embodiments are provided so that this disclosure will be thorough and complete. Like numbers refer to like elements throughout.

Embodiments described herein relate to data summary tables used to analyze data on a computer system.

Figure 1:
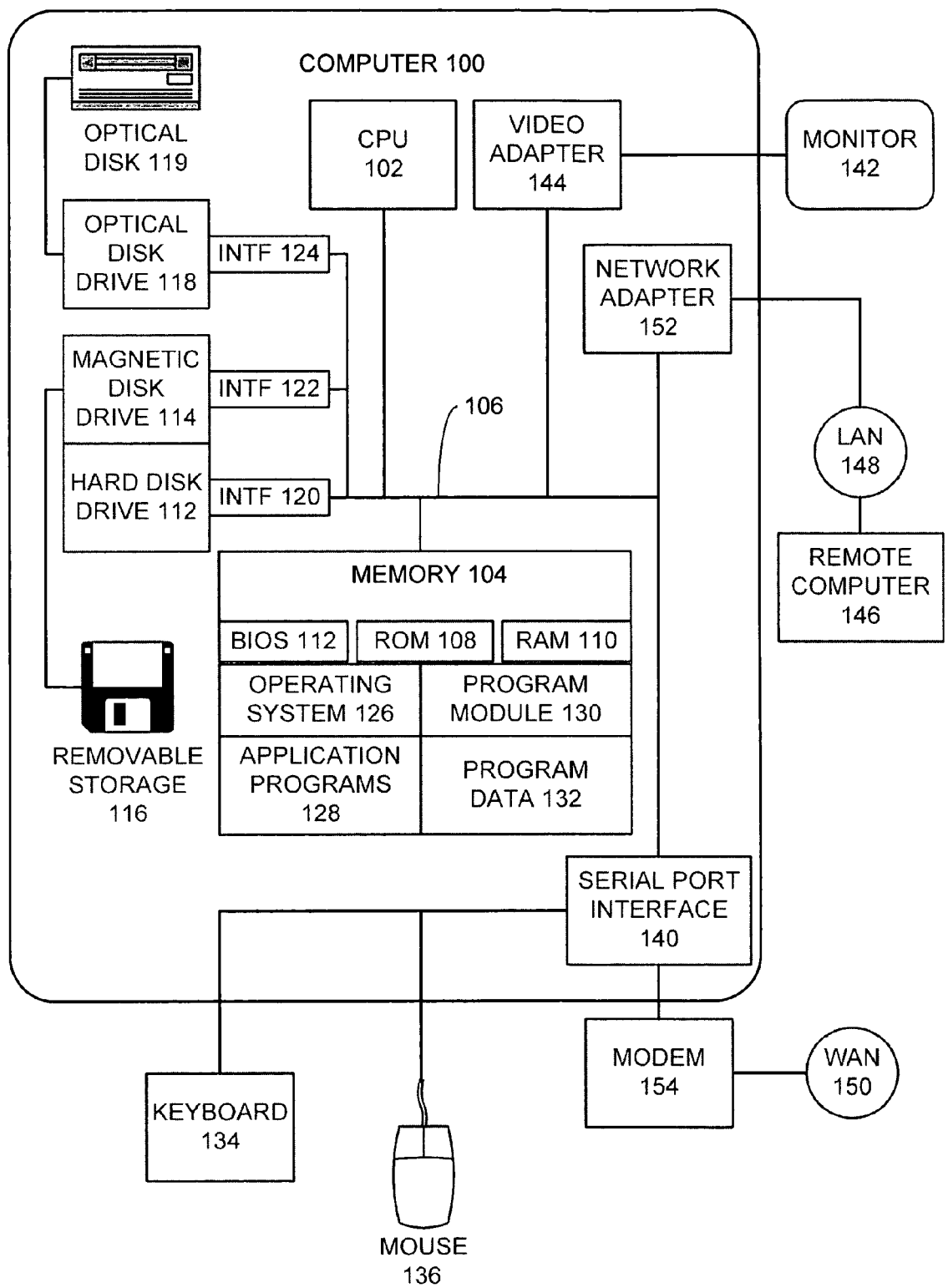
FIG. 1 illustrates an example general purpose computing system.

Referring now to FIG. 1, an example computer system 100 is illustrated. The computer system 100 illustrated in FIG. 1 can take a variety of forms such as, for example, a desktop computer, a laptop computer, and a hand-held computer. In addition, although computer system 100 is illustrated, the systems and methods disclosed herein can be implemented in various alternative computer systems as well.

The system 100 includes a processor unit 102, a system memory 104, and a system bus 106 that couples various system components including the system memory 104 to the processor unit 102. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, one or more application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). An LCD display 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Referring now to FIG. 2, an example program 200 is shown. In one example, program 200 is Microsoft's EXCEL spreadsheet software program running on a computer system, such as computer system 100 described above. Program 200 includes a spreadsheet 205 with an example list of data 210. A user can create a data summary table from data 210.

Figure 3:
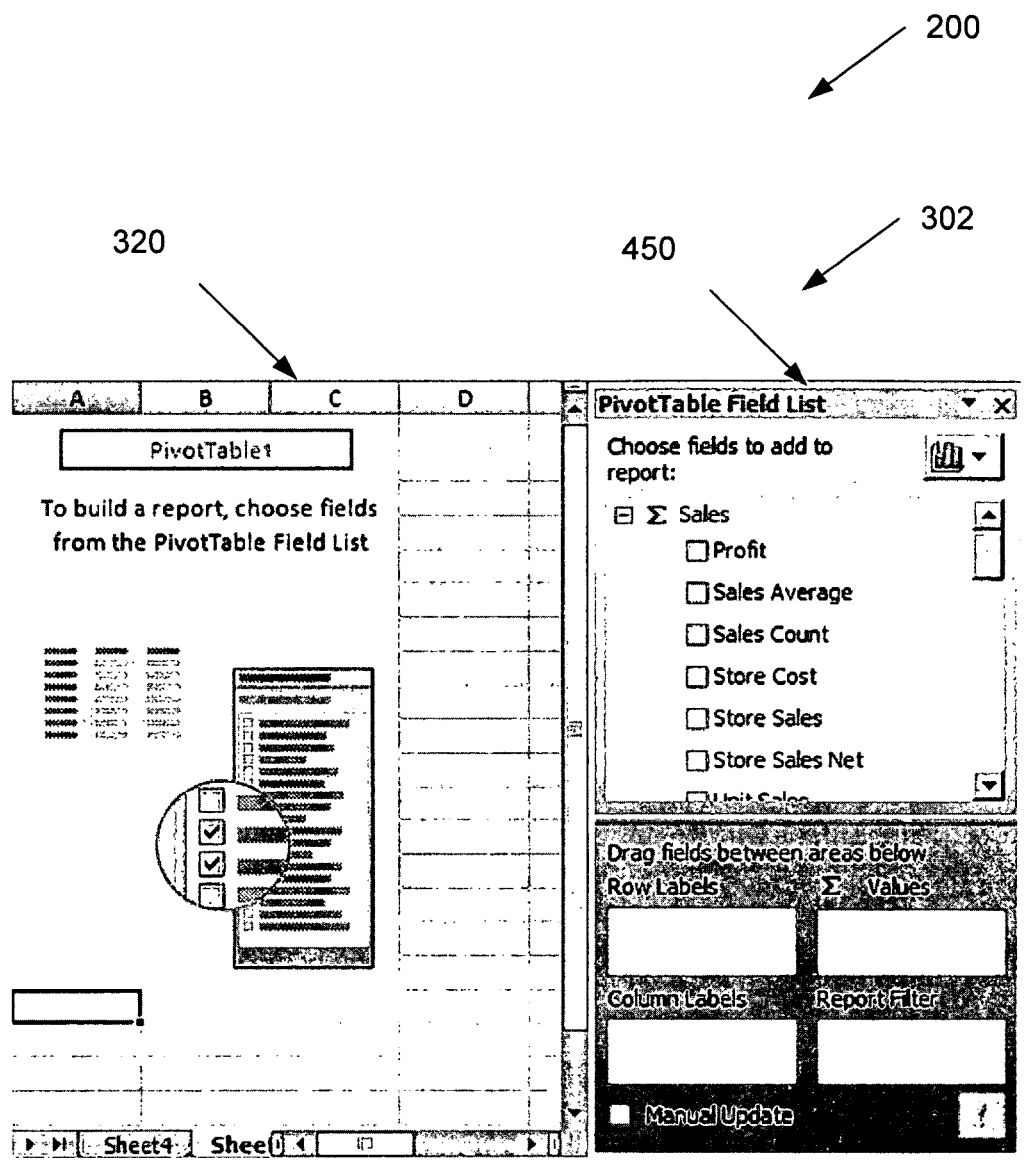
FIG. 3 illustrates an example data summary table and task pane of the spreadsheet program.

For example, referring now to FIG. 3, an example user interface 302 of program 200 is shown. User interface 302 includes an initial data summary table 320 (data summary table 320 is blank in FIG. 3). Data summary table 320 can be created from data from various sources. In one example as shown in FIG. 3, data summary table 320 can be created from data from one or more databases, as described further below. In other embodiments, data summary table 320 can be created from data in a spreadsheet, such as data 210 shown in FIG. 2.

User interface 302 of program 200 also includes an example task pane 450 that can be used to create and modify data summary table 320. For example, task pane 450 includes a list of the fields from data 210. The user can select and deselect fields from task pane 450 to create data summary table 320, as described further below.

I. Task Pane

Figure 4:
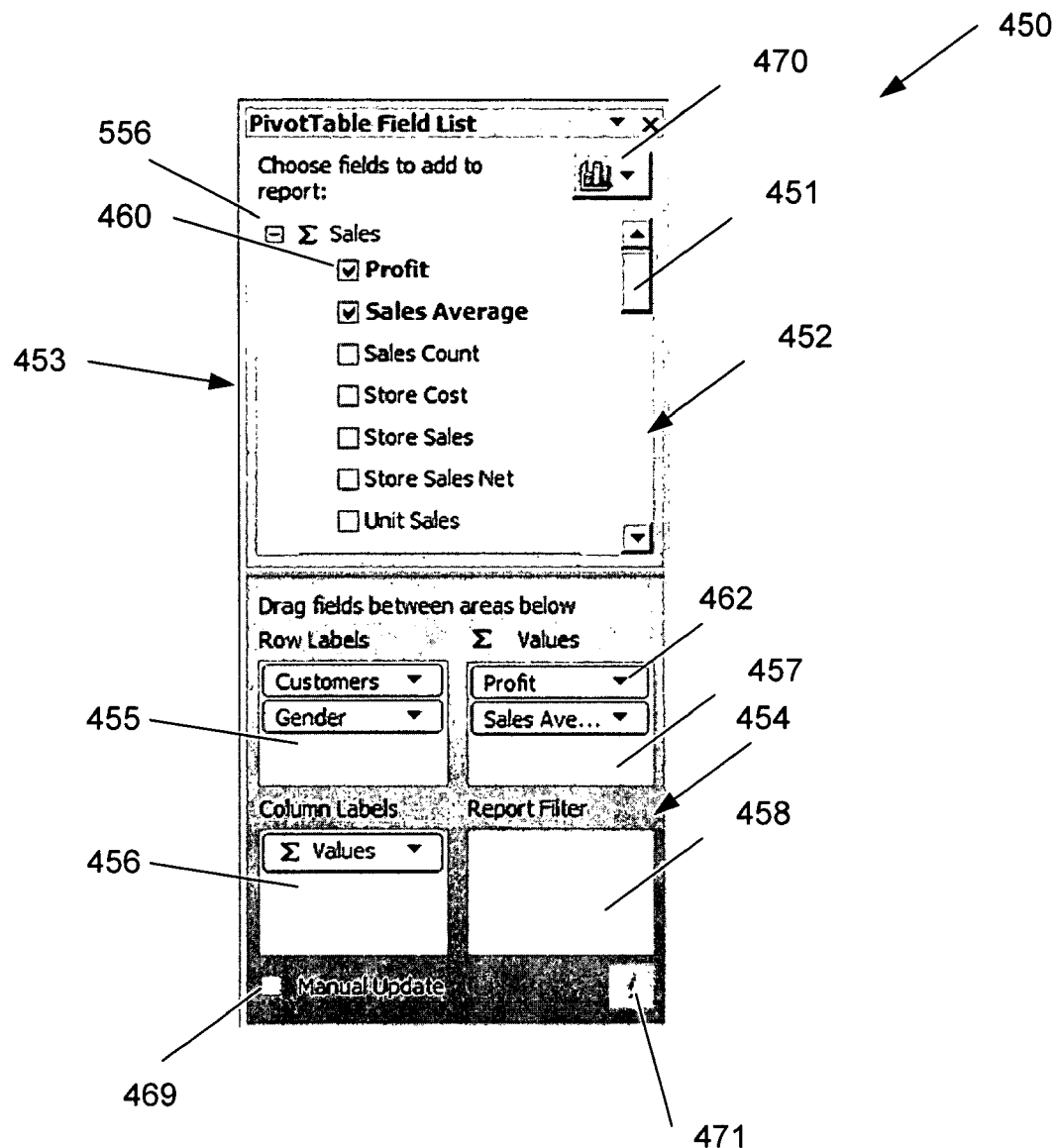
FIG. 4 illustrates the example task pane of FIG. 3.

Referring now to FIG. 4, example task pane 450 is shown. Task pane 450 generally includes a field pane 452 and a layout pane 454. Task pane 450 is used to create and modify data summary table 320, as described further below.

Field pane 452 includes a list 453 of each field in a given database or spreadsheet (e.g., spreadsheet 205 as shown in FIG. 2 above). A scroll bar 451 is provided because the list 453 of fields is longer than the space provided by field pane 452. In some embodiments, field pane 452 (and layout pane 454 as well) can be resized by the user. Each field in list 453 includes a checkbox next to the field. For example, the field "Profit" includes a checkbox 460 positioned adjacent to the field caption. When a field in list 453 is added to layout pane 454 as described below, the checkbox associated with the field is checked. For example, checkbox 460 for the "Profit" field is checked because it has been added to layout pane 454.

Layout pane 454 includes a plurality of zones that represent aspects of the data summary table 320 that is created using task pane 450. For example, layout pane 454 includes a row zone 455, a column zone 456, a value zone 457, and a filter zone 458. Row zone 455 defines the row labels for the resulting data summary table 320. Column zone 456 defines the column labels for data summary table 320. Value zone 457 identifies the data that is summarized (e.g., aggregation, variation, etc.) on data summary table 320. Filter zone 458 allows for the selection of filtering that is applied to all other fields in the other zones 455, 456, 457 (e.g., a field can be placed in filter zone 458 and one or more items associated with the field can be selected to create a filter to show only those items for all other fields in layout pane 454 that are associated with the item(s) selected for the field in filter zone 458).

One or more of the fields from field pane 452 are added to one or more of the zones of layout pane 454 to create and modify data summary table 320. In the example shown, the user can click, drag, and drop a field from list 453 of field pane 452 to one of the zones of layout pane 454 to add a field to the data summary table 320.

Figure 5:
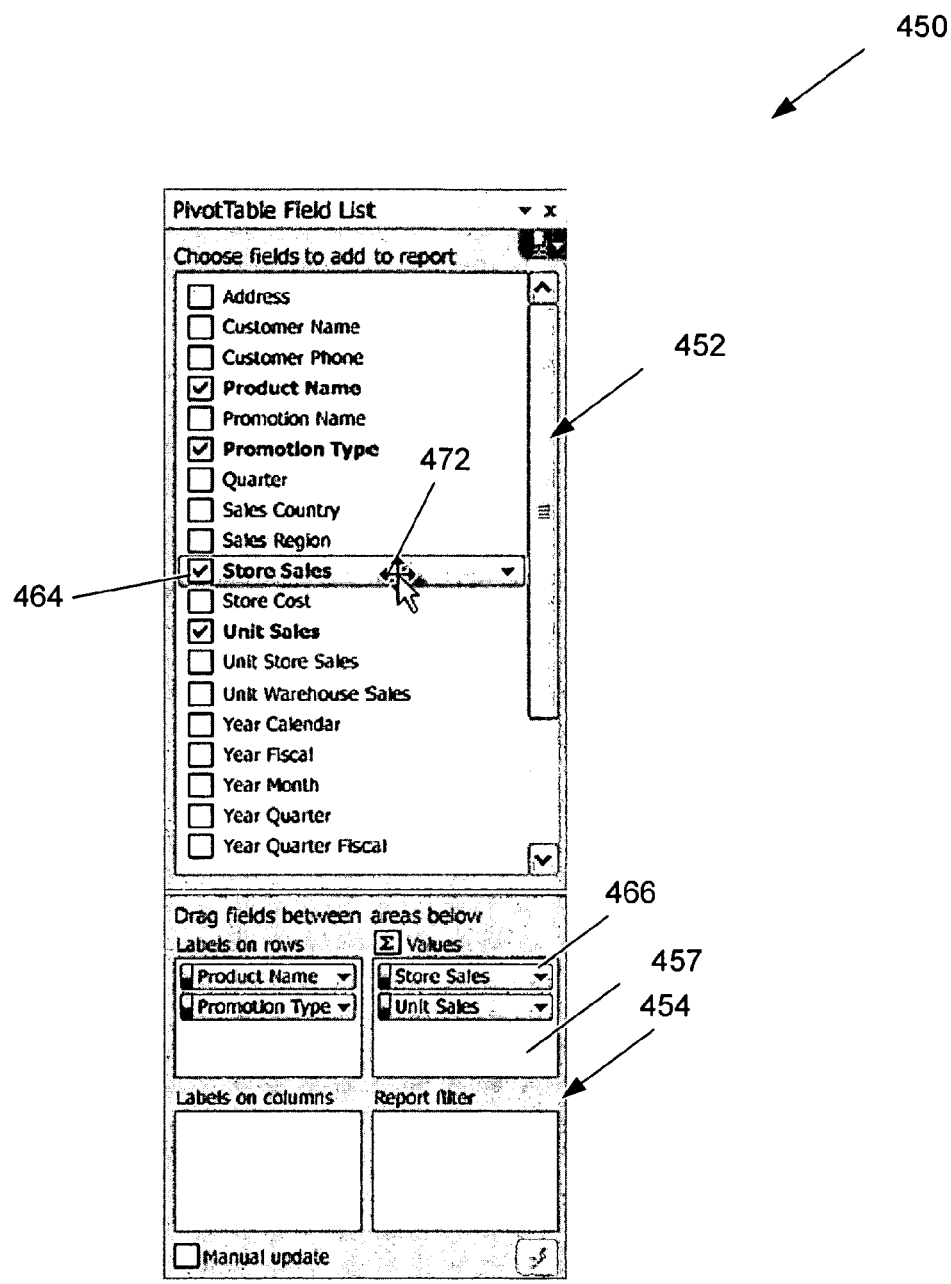
FIG. 5 illustrates another example task pane.

For example, as shown in FIG. 5, the user can hover over a particular field included in field pane 452, such as the "Store Sales" field 466. As the user hovers over the field, the user is presented with a cross-hair cursor 472 that indicates that the user can click and drag the selected field from the field pane 452 to one of the zones of the layout pane 454. Once the user selects the field, the cross-hair cursor 472 returns to a normal cursor, and the "Store Sales" field 466 can be dragged and dropped into the value zone 457, as shown. A field can similarly be removed from layout pane 454 by selecting and dragging the field out of layout pane 454.

In another example, the user can check the checkbox associated with a particular field in field pane 452 to add the field to layout pane 454. For example, if the user selects checkbox 460 associated with the "Profit" field shown in task pane 450 of FIG. 4, this field can be added to value zone 457 as "Profit" field 462. As described further below, program 200 can be programmed to analyze and place the selected field in an appropriate zone of layout pane 454. The user can similarly unselect a checked field to remove the field from layout pane 454. For example, if the user unselects checkbox 460, the "Profit" field 462 is removed from layout pane 454.

In an optional example, if a user clicks on a given field to select the field without dragging the field to one of the zones of drop zone 454, the user can be presented with a menu (e.g., similar to that of menu 482 shown in FIG. 6) that allows the user to select which zone to place the field.

Figure 7:
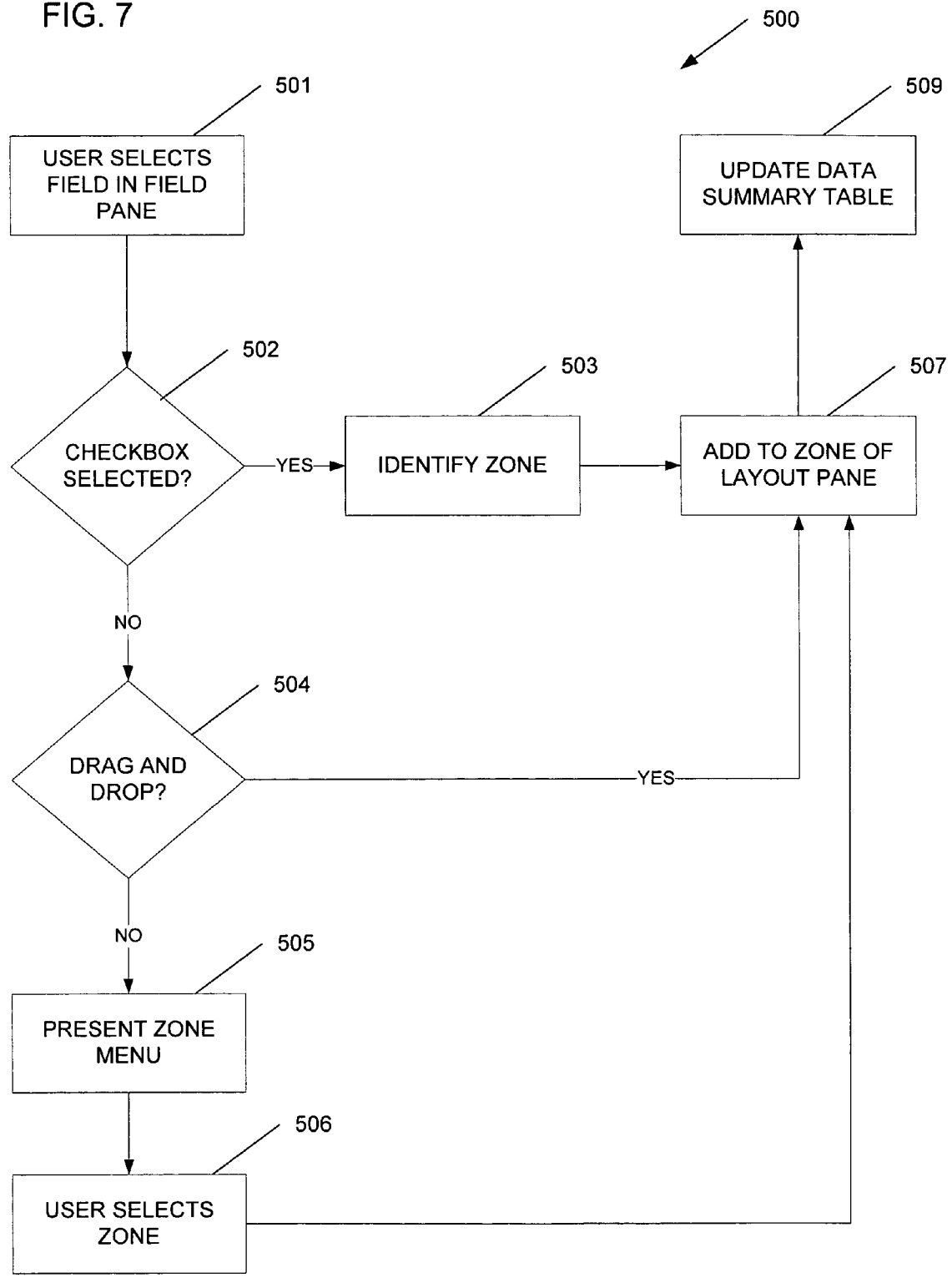
FIG. 7 illustrates an example method for placement of a field in a layout pane of the task pane of FIG. 4.

Referring now to FIG. 7, an example method 500 for adding a field from field pane 452 to a zone of layout pane 454 is shown. At operation 501, the user selects a field listed in field pane 452 to add to layout pane 454. At operation 502, a determination is made regarding whether the user selected the checkbox associated with the particular field. If the user selected the checkbox, control is passed to operation 503, and program 200 can automatically determine which zone of layout pane 454 to place the selected field. Next, in operation 507, the field is added to the appropriate zone of layout pane 454.

If a determination is made at operation 502 that the user has not selected the checkbox, control is passed to operation 504. At operation 504, a determination is made regarding whether the user has selected, dragged, and dropped the field into one of the zones of layout pane 454. If the user has dropped the field into one of the zones of layout pane 454, control is passed to operation 507, and the field is added to the zone.

If a determination is made at operation 504 that the user has not dragged and dropped the field, in an optional embodiment control is passed to operation 505 because the user has selected the field without selecting the checkbox or dragging/dropping the field into a zone of the layout pane 454. At operation 505, program 200 presents the user with a menu to allow the user to select the zone to which to add the field. Next, at operation 506, the user selects the desired zone. At operation 507, the field is added to the zone.

Once the field has been added to the zone of layout pane 454, control is passed to operation 509, and program 200 updates the data summary table 320 accordingly, as described below.

Referring again to FIG. 4, once a field such as the "Profit" field from the field pane 452 is added to one of the zones of layout pane 454, the checkbox (e.g., checkbox 460) associated with that field in field pane 452 is checked to indicate that the field is part of data summary table 320. In addition, the font of the field label associated with the field in field pane 452 is bolded. Similarly, when a field has not yet been made part of data summary table 320 (or has been removed therefrom), the checkbox associated with the field is left unchecked and the field is shown in normal, rather than bold, font. Others methods for indicating the fields that are part of data summary table 320 can also be used.

Figure 8:
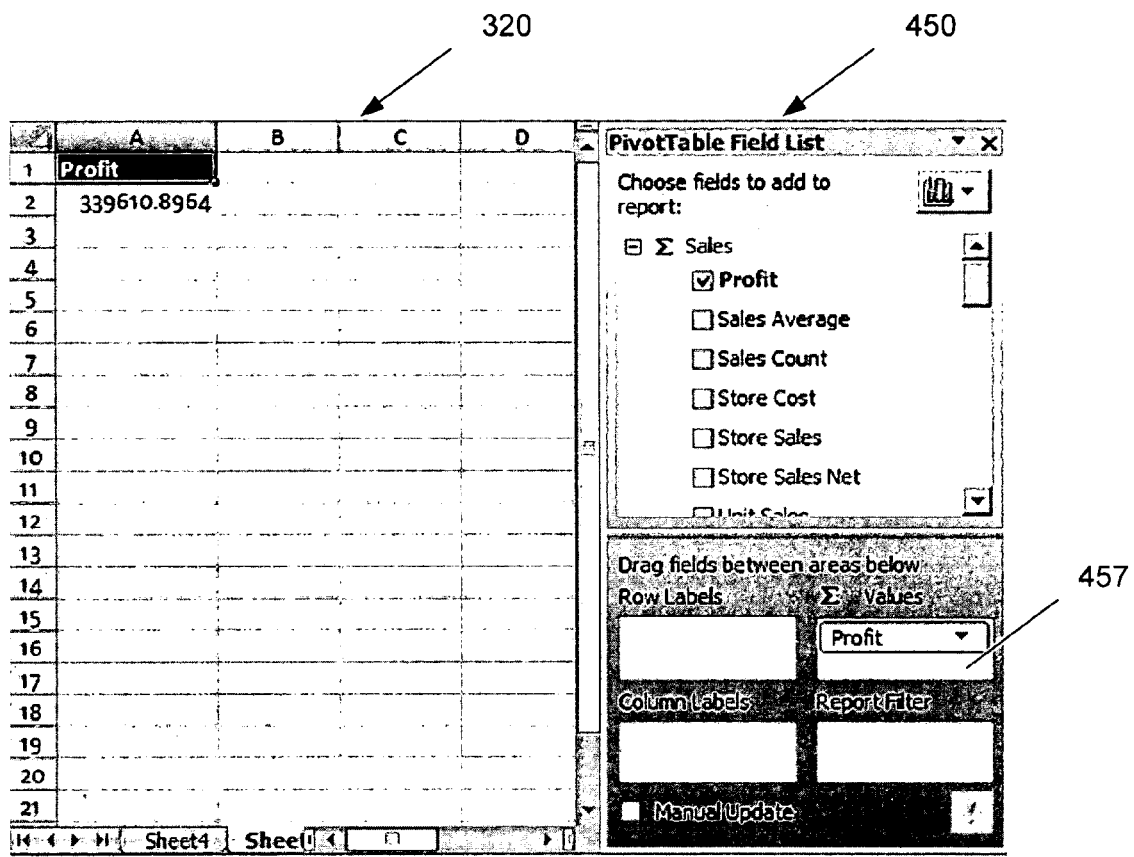
FIG. 8 illustrates the example data summary table and task pane of FIG. 3 with a field added to the table.
Figure 9:
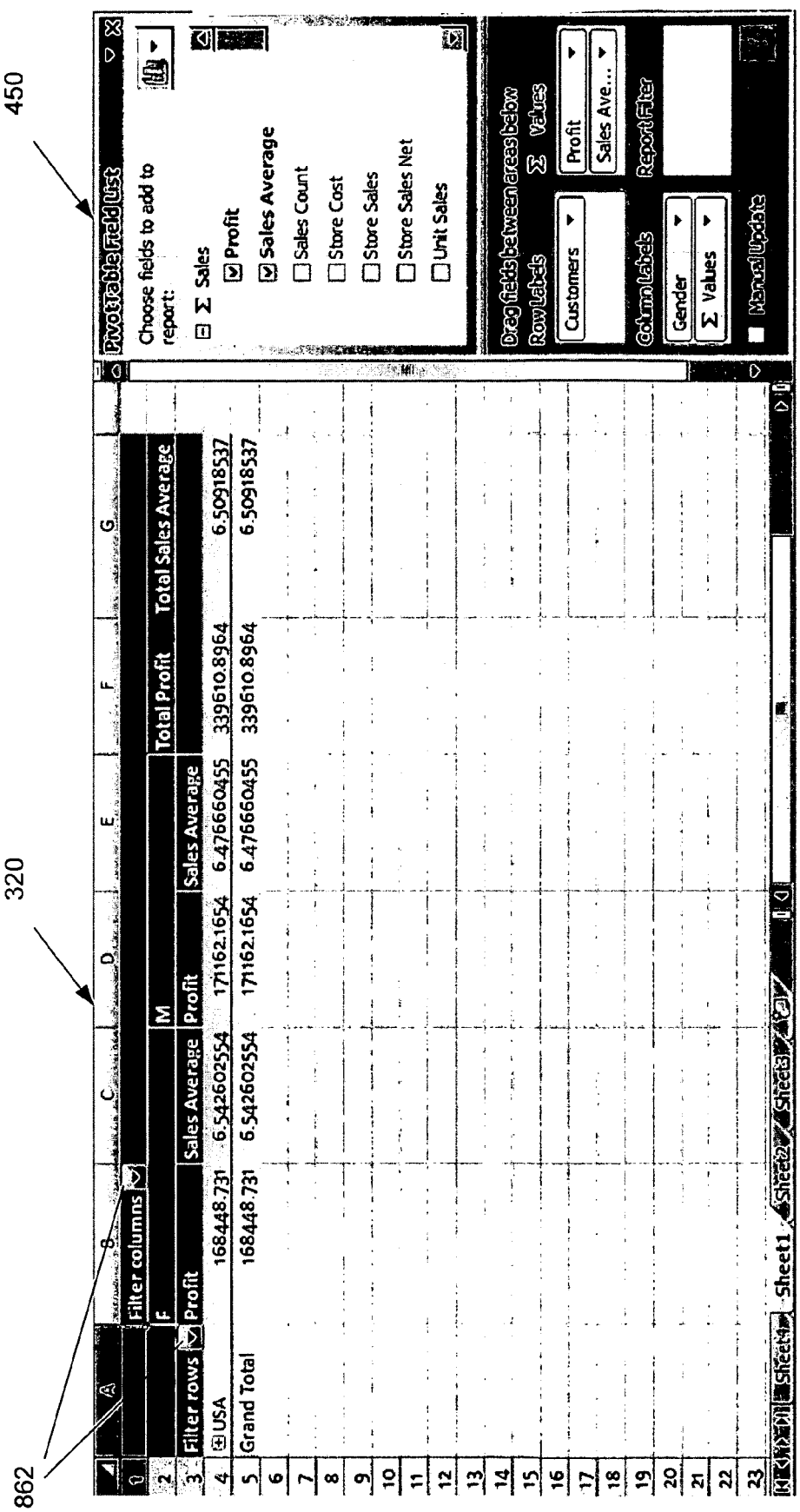
FIG. 9 illustrates the example data summary table and task pane of FIG. 3 with multiple fields added to the table.

As fields are added and removed from layout pane 454 of task pane 450, the resulting data summary table 320 is modified accordingly. For example, the user is initially presented with task pane 450 including field pane 452 as shown in FIG. 3. Referring to FIG. 8, when the user adds the "Profit" field to value zone 457 of layout pane 454, a sum of the data associated with the "Profit" field is automatically added to data summary table 320. Referring to FIG. 9, the user can add additional fields (e.g., "Sales Average," "Customers," "Gender") to zones of layout pane 454, and data summary table 320 is updated to include data related to the added fields.

Figure 10:
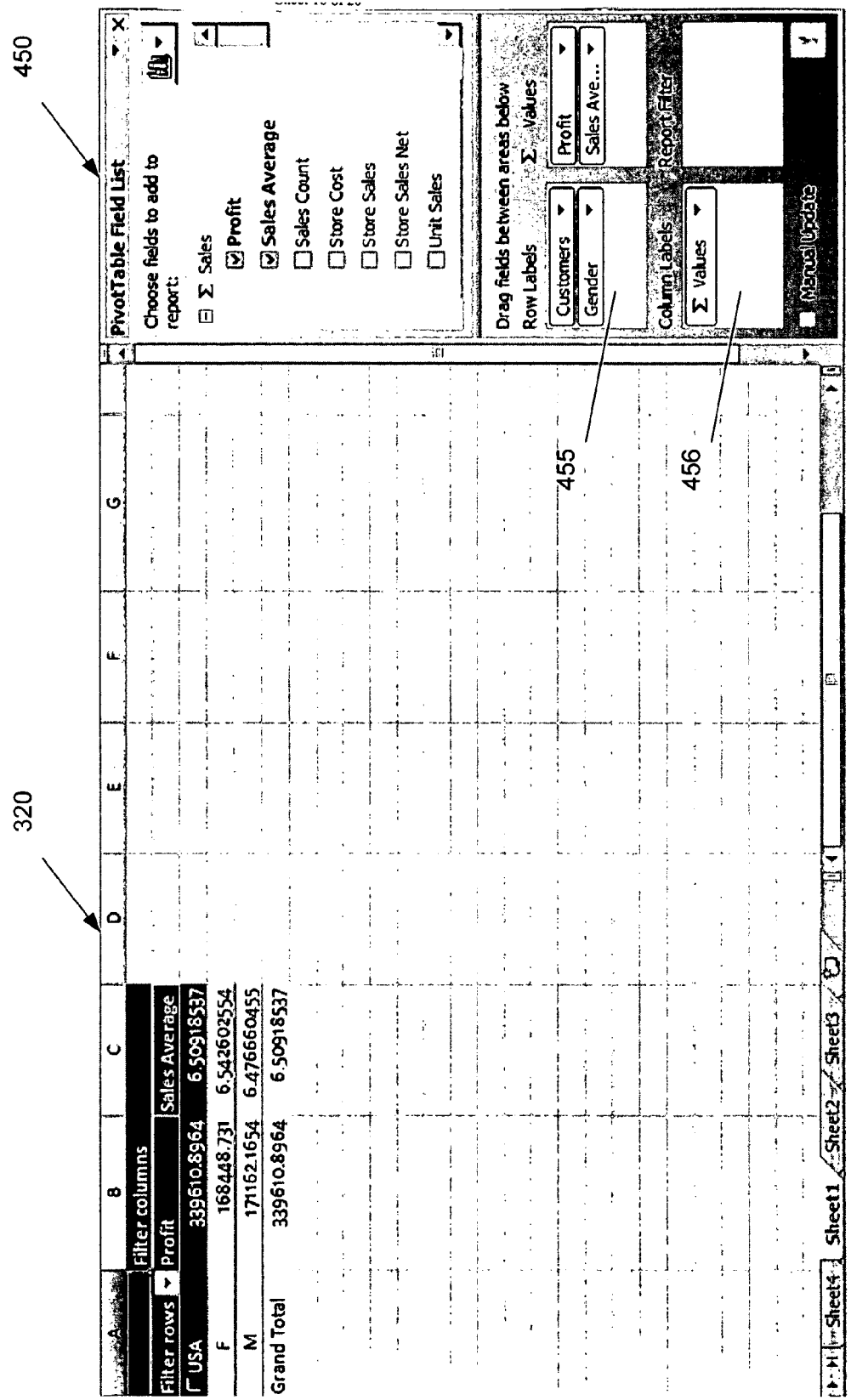
FIG. 10 illustrates the example data summary table and task pane of FIG. 9 with a field rearranged on the table.

Referring to FIG. 10, the user can also move fields from one zone to another zone in layout pane 454 of task pane 450, and data summary table 320 is updated accordingly. For example, the user can move the "Gender" field from column zone 456 to row zone 455, and data summary table 320 is automatically updated accordingly to reflect the change. The user can also move fields within a given zone 455, 456, 457, 458 to change the order in which the fields are displayed in data summary table 320. For example, the user can move the "Gender" field above the "Customer" field in row zone 455 so that the "Gender" field is shown prior to the "Customer" field in data summary table 320.

Figure 6:
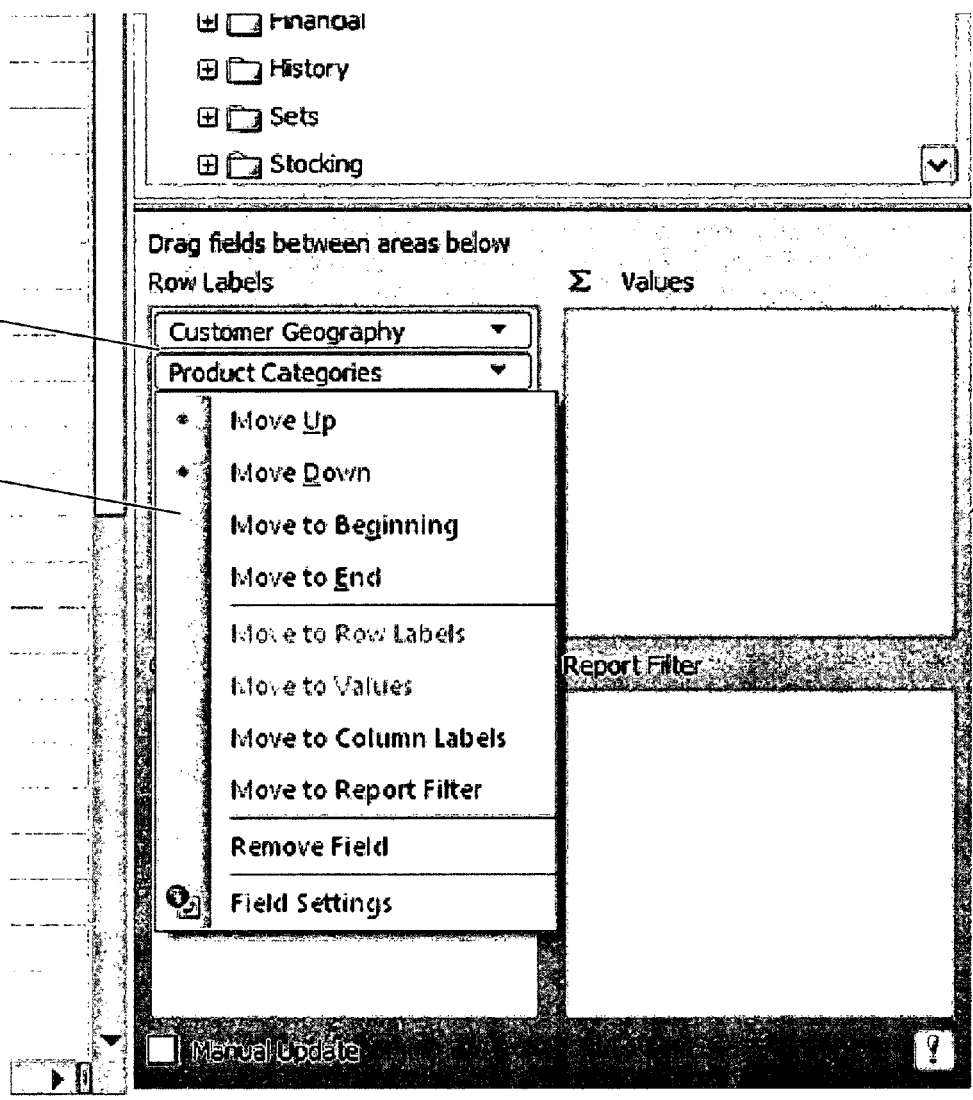
FIG. 6 illustrates an example menu for replacement of a field in a layout pane of a task pane.

Referring now to FIG. 6, in one example if the user clicks and releases a field such as "Product Categories" field 481 located in layout pane 454 without dragging the field, the user is presented with a menu 482 that allows the user to manipulate the placement of the field within layout pane 454. For example, menu 482 allows the user to change the position of the field within a given zone (i.e., "Move Up," "Move Down," "Move to Beginning," "Move to End"), move the field between zones (i.e., "Move to Row Labels," "Move to Values," "Move to Column Labels," "Move to Report Filter"), and remove the field from layout pane 454 (i.e., "Remove Field"). Only those options that are available for a particular field are shown as active choices in menu 482 (e.g., "Move to Row Labels" is shown as inactive in the example because field 481 is already in row zone 455).

Referring again to FIG. 4, task pane 450 also includes a manual update checkbox 469. When checkbox 469 is selected, the resulting data summary table 320 is not automatically updated as fields are added, rearranged, and removed from layout pane 454 of task pane 450. For example, if the user selects manual update checkbox 469 and then adds a field to row zone 455 of layout pane 454, data summary table 320 is not automatically updated to reflect the newly added field. Instead, update occurs after the user selects a manual update button 471 that becomes active once a change has been made and a manual update can be performed. Manual updates can be used to increase efficiency when working with large amounts of data that require significant retrieval and processing time to create the data summary table 320. In this manner, the desired fields and filtering can be selected prior to creation or revision of the data summary table 320, which occurs upon selection of the manual update button 471, thereby enhancing efficiency.

Figure 11:
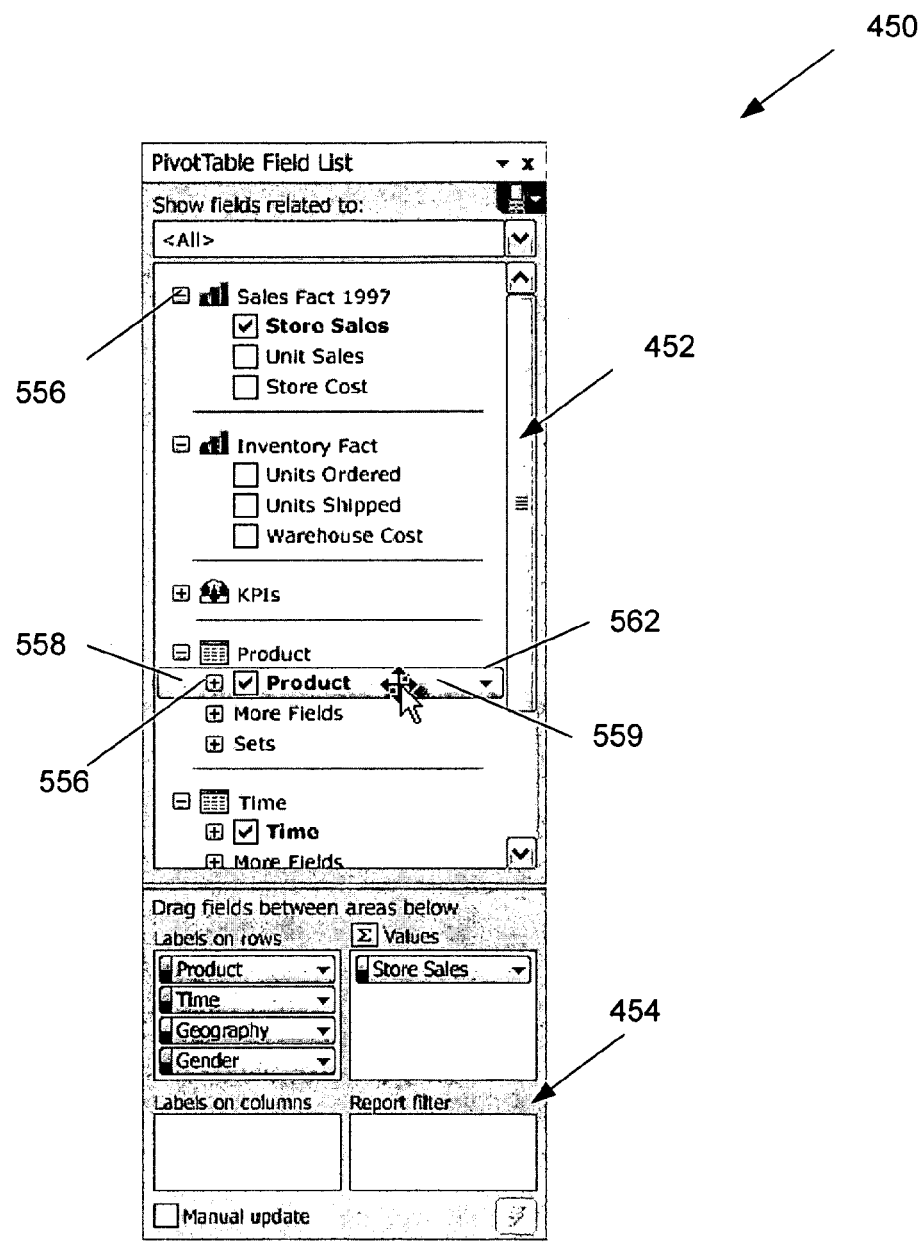
FIG. 11 illustrates another example task pane.

Referring to FIG. 11, the fields shown in field pane 452 represent data fields of the "online analysis processing" (OLAP) type. (In contrast, the fields shown in field pane 452 in FIG. 5 are of non-OLAP type, sometime referred to as relational fields.) OLAP is a category of tools that provides analysis of data stored in a database. OLAP tools allow users to analyze different dimensions of multidimensional data. OLAP data fields are arranged in a hierarchical structure with a plurality of levels. For example, the "Sales Fact 1991" field includes sub-fields "Store Sales," "Unit Sales," and "Store Cost." Sub-fields can be accessed by clicking on the drill indicator (plus/minus +/- sign) 556 to expand and collapse the sub-fields. OLAP data can be arranged into dimensions with hierarchies and measures.

In the embodiment shown, each field listed in field pane 452 includes a plurality of components. A field can be highlighted by hovering over or clicking the field. For example, each field, such as the "Product" field shown in FIG. 11 includes selection areas 558 and 559 that allow a user to select and drag the field. Each field also includes checkbox 560 that can be used to add/remove the field from data summary table 320. In addition, each field of OLAP data type can include drill indicator 556 that is used to expand and collapse the sub-fields associated with the field. In addition, each field includes a drop down area 562 used to access filtering options, as described further below.

Figure 12:
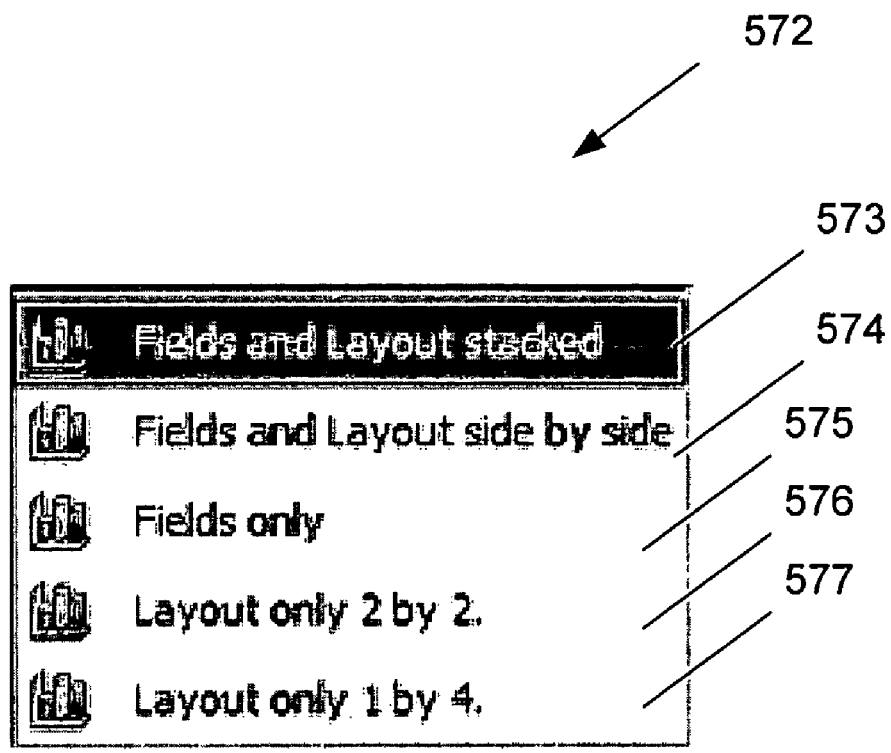
FIG. 12 illustrates an example menu for modifying a layout of the task pane of FIG. 11.
Figure 13:
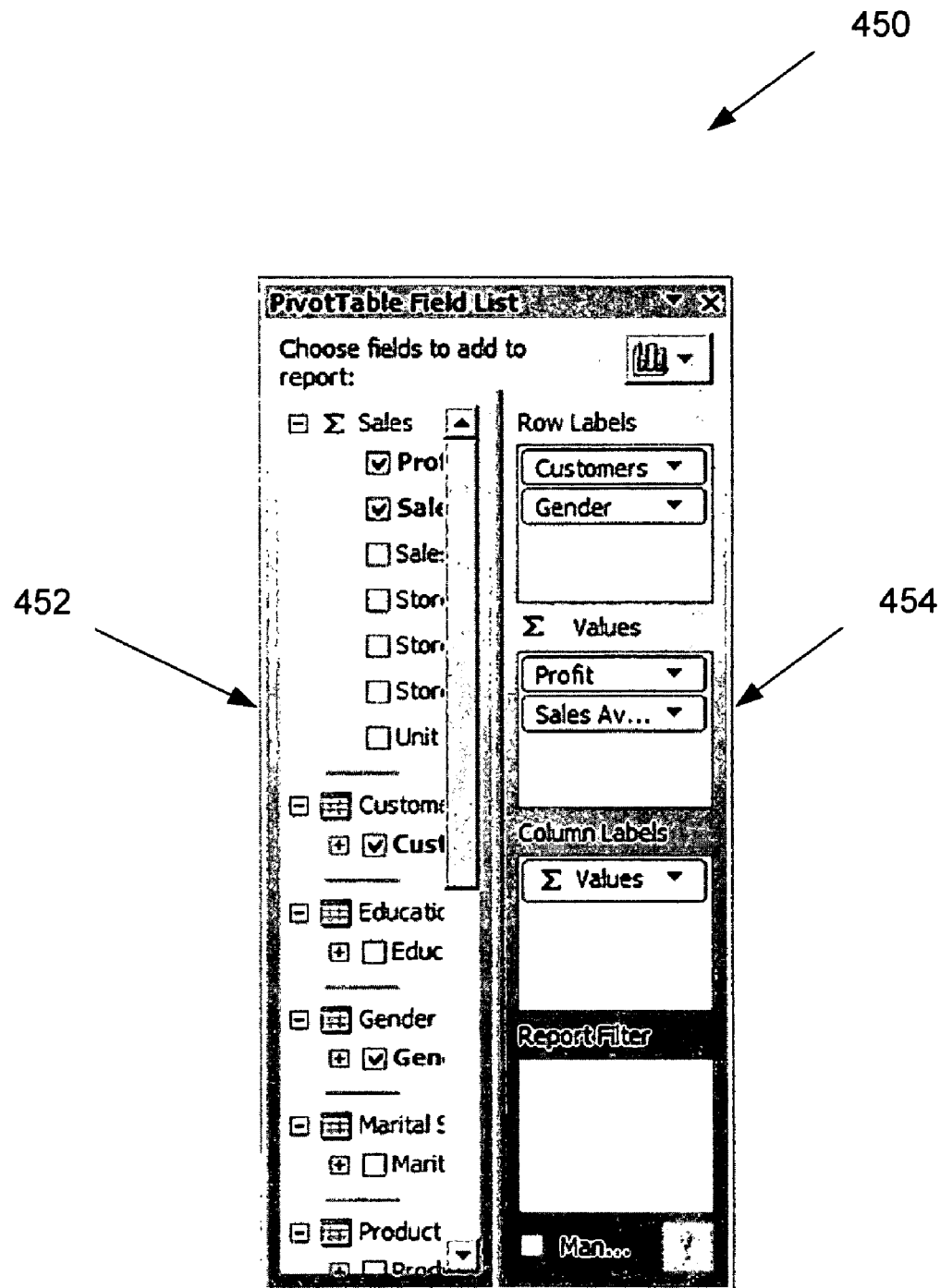
FIG. 13 illustrates the example task pane of FIG. 11 in a different layout.
Figure 14:
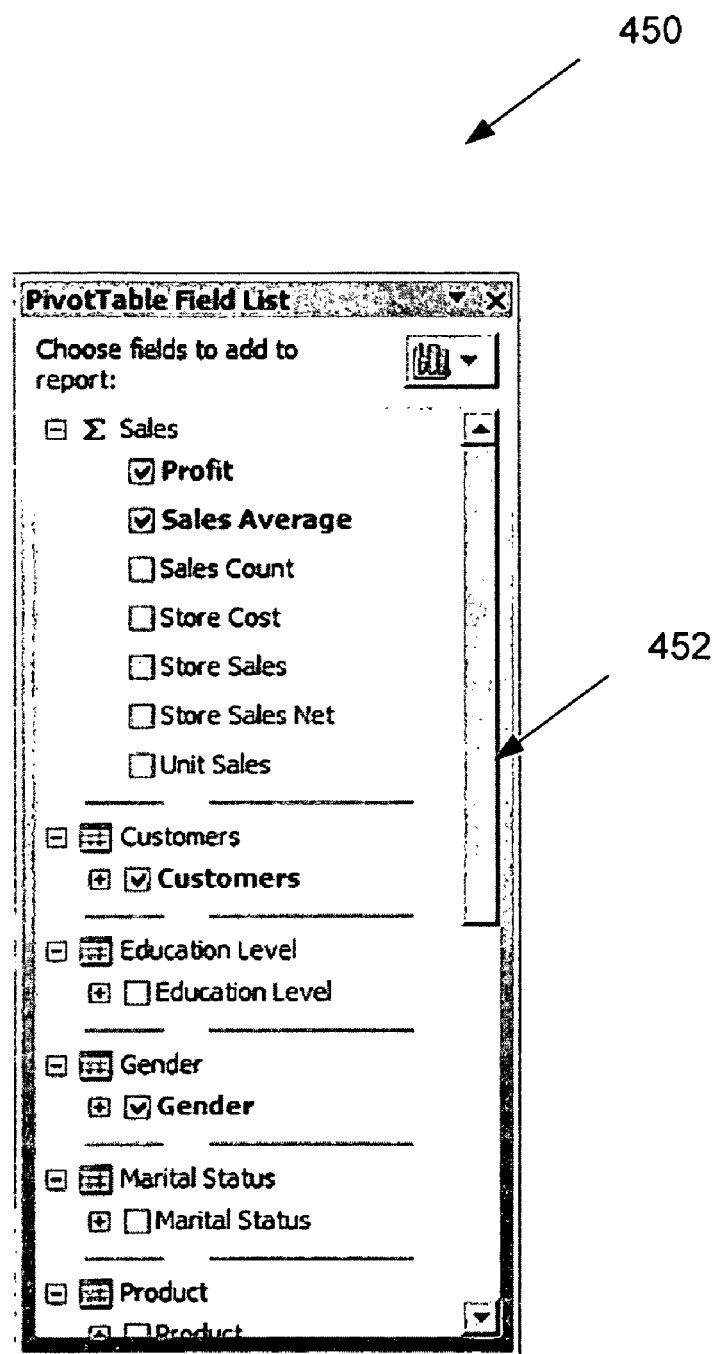
FIG. 14 illustrates the example task pane of FIG. 11 in a different layout.
Figure 15:
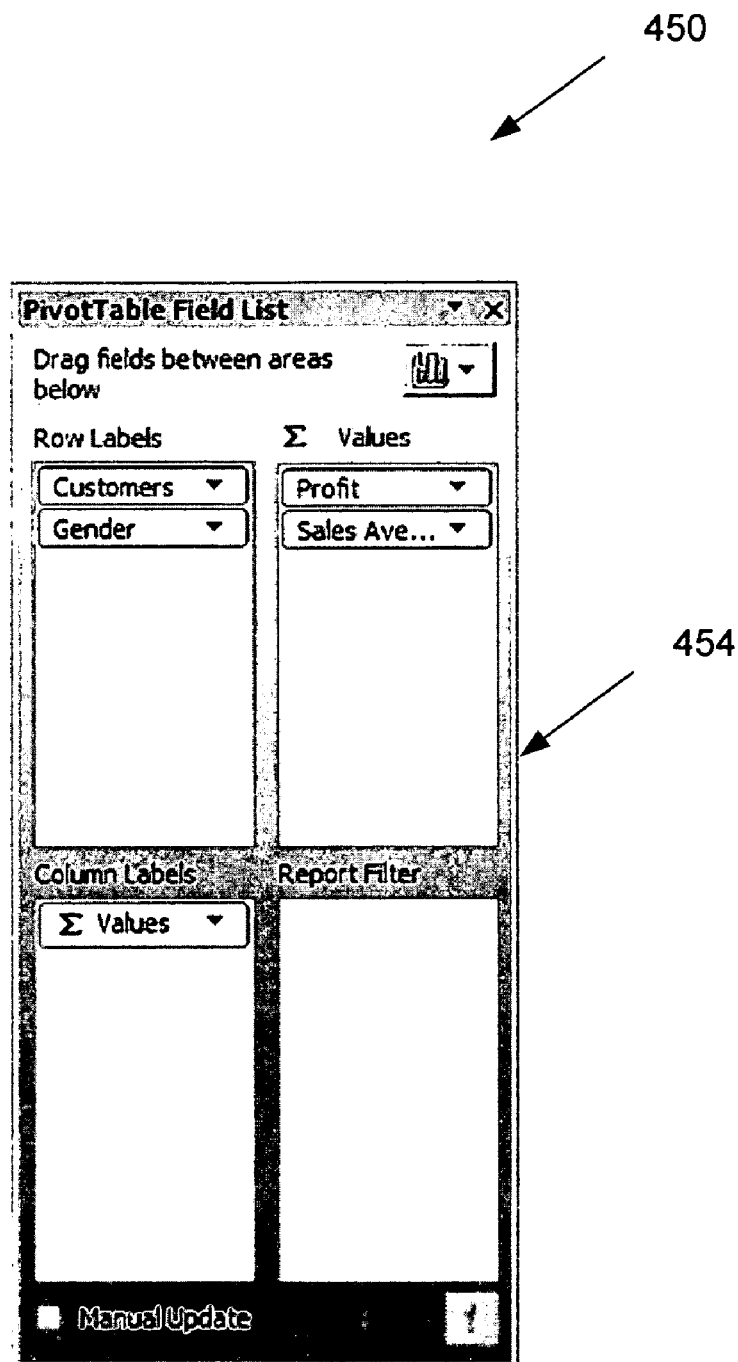
FIG. 15 illustrates the example task pane of FIG. 11 in a different layout.
Figure 16:
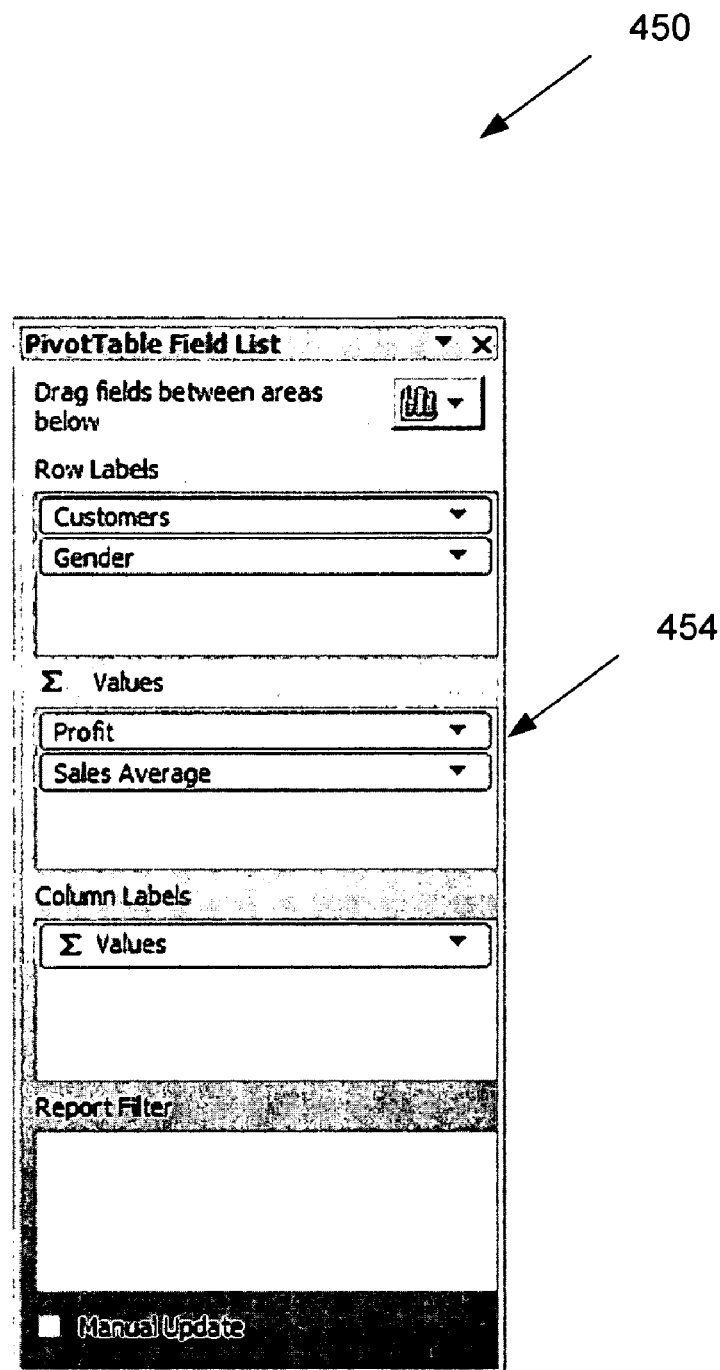
FIG. 16 illustrates the example task pane of FIG. 11 in a different layout.

Referring again to FIG. 4, task pane 450 also includes a control 470 that allows the user to modify the layout of task pane 450. For example, the user can select control 470 to access a layout menu 572, as shown in FIG. 12. Layout menu 572 is used to arrange panes 452 and 454. For example, if the user selects "Fields and Layout stacked" 573 in control 470, field pane 452 is positioned above layout pane 454 in task pane 450 to form a single integrated pane, as shown in FIG. 4. If the user selects "Fields and Layout side by side" 574 in control 470, field pane 452 is positioned along side layout pane 454 in task pane 450 to form a single integrated pane, as shown in FIG. 13. If the user selects "Fields only" 575 in control 470, field pane 452 is shown in isolation, as shown in FIG. 14. If the user selects "Layout only 2 by 2" 576 in control 470, layout pane 454 is shown in isolation with zones 455, 456, 457, 458 arranged in a 2×2 square, as shown in FIG. 15. If the user selects "Layout only 1 by 4" 577 in control 470, layout pane 454 is shown in isolation with zones 455, 456, 457, 458 arranged in a 1×4 square, as shown in FIG. 16.

In the example shown in FIG. 5, the fields in field pane 452 are listed in alphabetical order. For lists including OLAP type data such as that shown in FIG. 4, the measures are shown first, and the dimensions are shown in alphabetical order thereafter. In the examples shown, the dimension folders are shown in expanded form, with all other fields shown in collapsed form. Other configurations can also be used.

II. Automated Placement of a Field in Layout Pane

Referring again to FIG. 4, if a user selects a field by checking the checkbox associated with the field, program 200 is programmed to automatically place the selected field in one of the zones of layout pane 454, as described below.

Generally, fields of a numeric type are added to value zone 457, and fields of a non-numeric type are added to row zone 455 of layout pane 454. For example, fields of a numeric type (e.g., monetary sales figures) are typically aggregated and are therefore placed in value zone 457, while fields of a non-numeric type (e.g., product names) are typically used as row labels and are therefore automatically placed in row zone 455.

Figure 17:
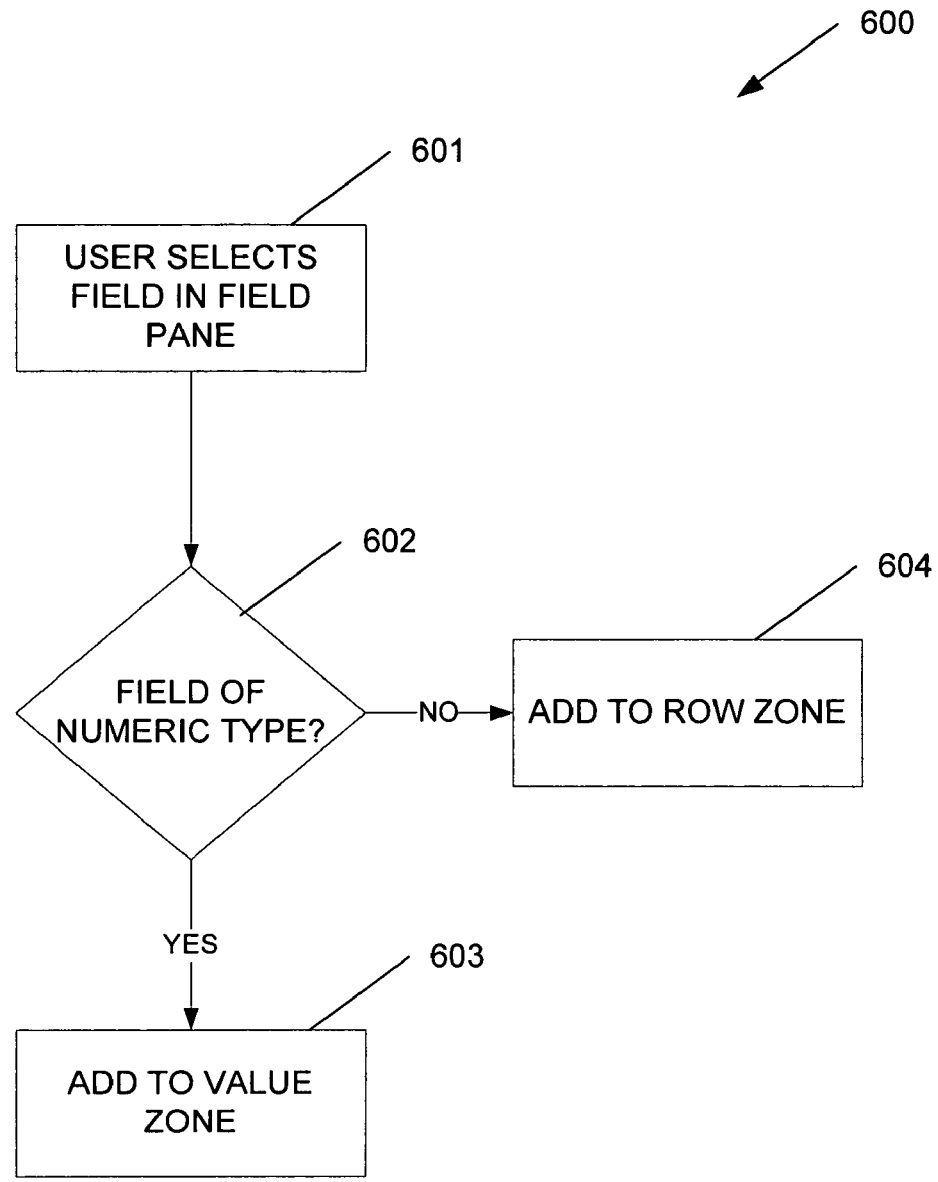
FIG. 17 illustrates an example method for placement of a field in a layout pane of the task pane of FIG. 4.

Referring now to FIG. 17, an example method 600 for automatically adding a selected field to one of the zones of layout pane 454 is shown. At operation 601, the user selects a field in field pane 452 using, for example, the checkbox associated with the field. Next, at operation 602, a determination is made regarding whether the field is of a numeric type. If the field is of numeric type, control is passed to operation 603, and the field is added to the value zone 457 for aggregation. If the field is determined to not be of numeric type at operation 602, control is passed to operation 604, and the field is added to the row zone 455.

In some embodiments, a field of numeric type can be further analyzed prior to adding the field to the value zone 457 to determine if a different placement in layout pane 454 is more appropriate. For example, a field including a plurality of zip code values is of numeric type, but it is typically desirable to place such a field in row zone 455, rather than in value zone 457. For this reason, fields of numeric type are further analyzed in some embodiments using data semantics to identify desired placement in layout pane 454.

In one embodiment, a lookup table, such as example Table 1 below, is used to identify fields of numeric type that are added to row zone 455 rather than value zone 457.

TABLE 1

| FieldTypeString | MinValue | MaxValue |
|---|---|---|
| "zip" | | |
| "year" | | |
| "quarter" | 1 | 4 |
| "qtr" | 1 | 4 |
| "month" | 1 | 12 |
| "week" | 1 | 52 |
| "day" | 1 | 31 |
| "id" | | |
| "number" | | |
| "social security number" | | |
| "ssn" | | |
| "phone number" | | |
| "date" | | |

In Table 1, the column "FieldTypeString" includes text strings that are compared to the caption for the selected field, as described further below. In the example shown, the caption for the selected field is compared against each string in the FieldTypeString column of Table 1 to identify any case-insensitive matches.

If a match is made between a text string in the FieldTypeString column and the caption for the selected field, numeric items in the field are further analyzed using the values in the "MinValue" and "MaxValue" columns of Table 1. The value in the MinValue column specifies the minimum value of any of the items of the given FieldTypeString type. The value in the MaxValue column specifies the maximum value of any of the items of the given FieldTypeString type. If no MinValue is defined in Table 1 for a particular FieldTypeString type, a determination is made regarding whether the numeric items are integers below the MaxValue. If no MaxValue is defined for a particular FieldTypeString type, a determination is made regarding whether the numeric items are integers above the MinValue. If neither a MinValue nor a MaxValue is defined for a particular FieldTypeString type, a determination is made regarding whether the numeric items are integers.

For example, if a selected field includes the caption "Month," Table 1 is parsed and a match is identified with FieldTypeString value "month." Next, the numeric values associated with the field are parsed to determine if the numeric values fall within the minimum and maximum values "1" and "12" (representing January through December). In one embodiment, all numeric items for the field are tested. In other embodiments, such as when there are a significantly large number of numeric items, only a sample of the numeric items is tested against the minimum and maximum values in Table 1. If all of the values fall within the minimum and maximum values, then the field is added to the row zone 455, rather than the value zone 457, as described further below.

The text strings and minimum and maximum values shown in Table 1 are examples only, and different strings and values can be used. For example, the text strings and minimum/maximum values can be modified depending on the geographic location at which the data is generated (e.g., phone number values can differ depending on geographic location). In other embodiments, different types of semantic checking can be used. For example, the number of digits of the numeric items can be analyzed in addition to or in place of checking the actual values for the numeric items. For example, if a caption for a field matches the text string "zip" (i.e., zip codes), the number of digits for the numeric items in the field can be examined to see if the digits fall between a minimum of five (e.g., "90210" includes five digits) and a maximum of ten (e.g., "90210-1052" includes ten digits).

Figure 18:
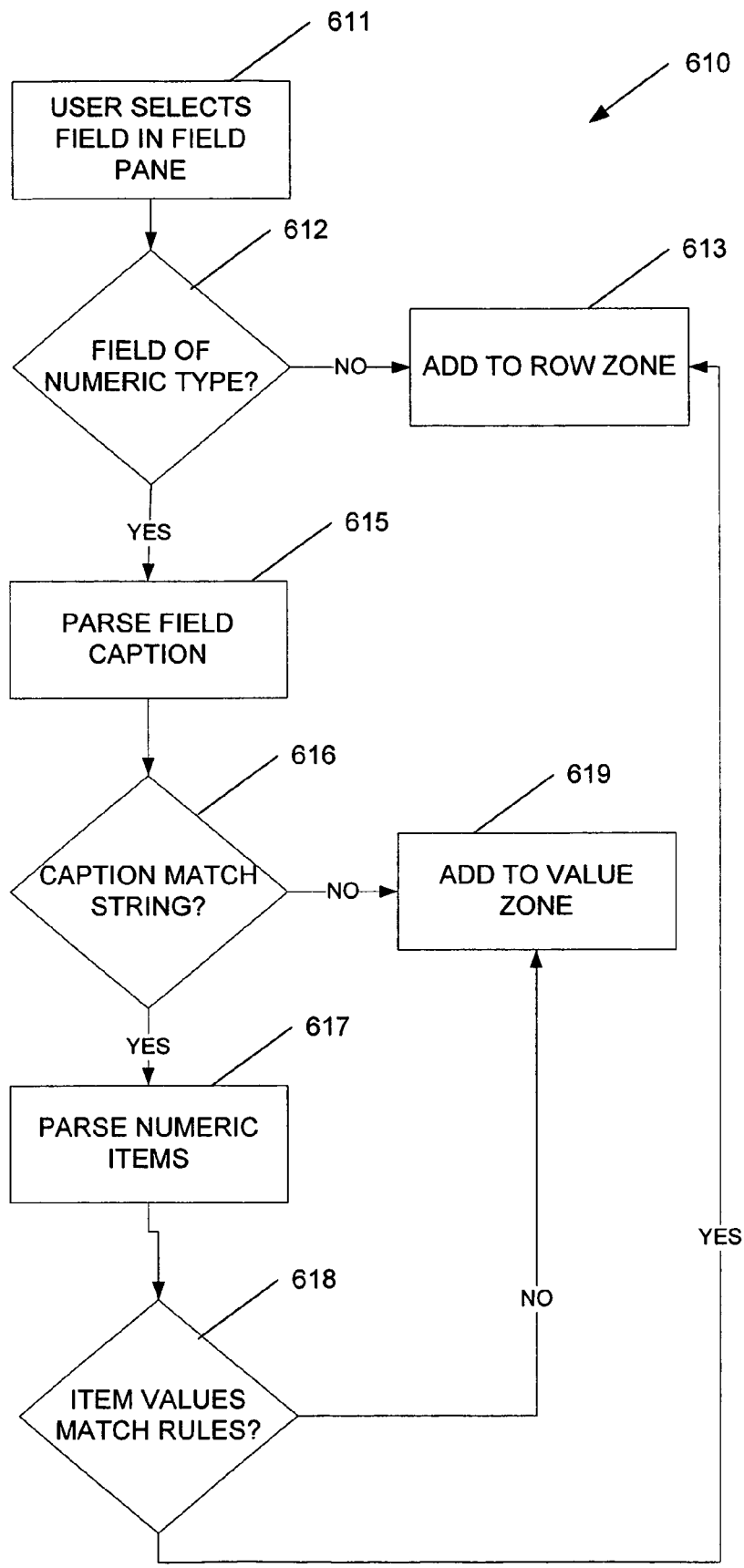
FIG. 18 illustrates another example method for placement of a field in a layout pane of the task pane of FIG. 4.

Referring now to FIG. 18, an example method 610 is shown for automatic placement of a selected field in layout pane 454. Method 610 is similar to method 600 described above, except that fields of numeric type are further analyzed. At operation 611, the user selects a field in field pane 452 using, for example, the checkbox associated with the field. Next, at operation 612, a determination is made regarding whether the field is of numeric type. If the field is of non-numeric type, control is passed to operation 613, and the field is added to row zone 455.

If the determination at operation 612 is that the field is of a numeric type, control is passed to operation 615. At operation 615, the caption for the field is parsed, and, at operation 616, the caption is compared to a lookup table of text strings such as that shown in Table 1 above. If a match between the caption and a text string is not made in operation 616, control is passed to operation 619, and the field is added to value zone 457. If a match in operation 616 between the caption and a text string in Table 1 is made, control is passed to operation 617.

At operation 617, numeric items of the field are parsed, and, at operation 618, the values of the numeric items are compared to the minimum and maximum values in Table 1 associated with the text string. If the numeric items fall outside the minimum and maximum values as described above, control is passed to operation 619, and the field is added to value zone 457. If the numeric items fall within the minimum and maximum values at operation 618, control is passed to operation 613, and the field is added to row zone 455.

In this manner, specific fields of numeric type can automatically be identified and placed in the row zone 455, rather than the default value zone 457. If a field is automatically placed by program 200 in a particular zone of layout pane 454 and the user wants the field to be placed in a different zone, the user can select and drag the field to the desired zone.

Figure 19:
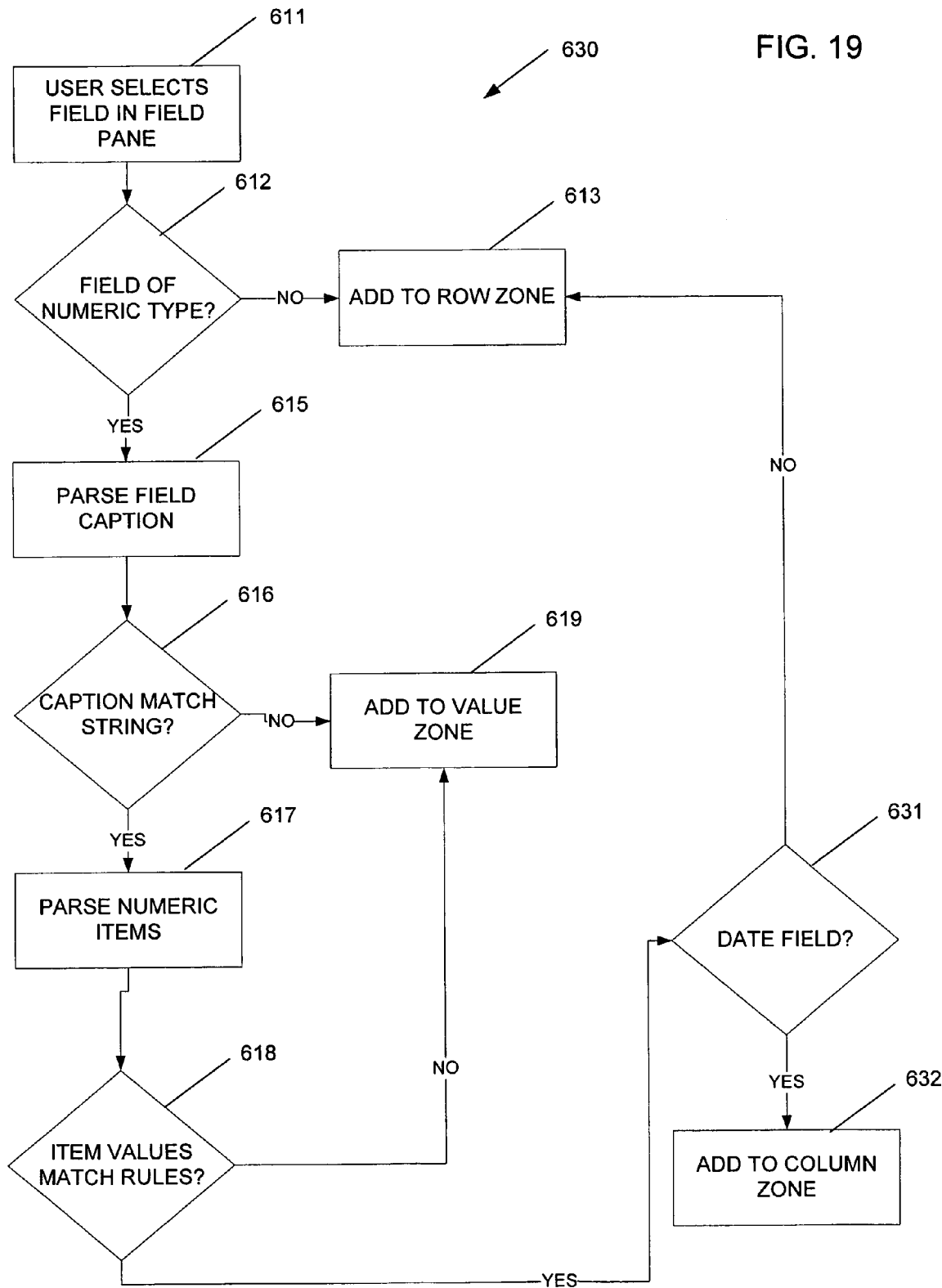
FIG. 19 illustrates another example method for placement of a field in a layout pane of the task pane of FIG. 4.

In some embodiments, fields associated with date information are identified and placed in column zone 456, rather than row zone 455 or value zone 457. For example, method 630 shown in FIG. 19 is similar to method 610 described above, including operations 61-619. However, at operation 618, if the numeric items fall within the minimum and maximum values, control is passed to operation 631. At operation 631, a determination is made as to whether the field is a date field. In the example shown, this determination is made by the text string to which the caption is matched. For example, if the caption for the field includes the text "Date" and is matched with the text string "date" in Table 1, then the field is identified as a date field. If the field is a date field, control is passed to operation 632, and the field is added to column zone 456. If the field is not a date field, control is passed to operation 613, and the field is added to row zone 455.

In alternative embodiments, Meta data associated with a particular field can be used to identify attributes about the field. For example, Meta data can be used to identify if a field is a numeric and/or a date field.

In some embodiments, the following rules are used when automatically adding a field identifying OLAP data to layout pane 454 and data summary table 320:

A. OLAP hierarchies/OLAP named sets
 1. the hierarchy is added to the row zone
 2. the hierarchy is nested on the inside of all other fields in the row zone
 3. for hierarchies with multiple levels, the highest level field is displayed in the data summary table and the user can drill to see lower level fields B. OLAP measures/OLAP KPI expressions
 1. if at least one measure is already added, the measure is added to the same zone as the already added measures
 2. adding the second measure introduces a Data field (see, for example, "Σ Values" field in FIG. 10) in the layout pane, and the Data field is placed in the column zone by default—the Data field is displayed in the layout zone when there are two or more fields in the value zone
 3. when added, the Data field is nested on the inside of all other fields in the column zone
 4. the Data field resides in either the row or column zones In some embodiments, the following additional rules are used when automatically adding a field identifying non-OLAP data, or relational field, to layout pane 454 and data summary table 320:

A. for non-numeric fields, the field is added to the row zone—the field is nested on the inside of all other fields in the row zone B. for numeric fields, the field is added to the value zone
   1. if at least one field is already in the value zone, this field will be added to the same zone as the already added field
   2. adding the first field to the value zone introduces the Data field in the layout pane, and the Data field is placed in the column zone by default
   3. when added, the Data field is nested on the inside of all other fields in the column zone
   4. the Data field resides in either the row or column zones III. Filtering Task Pane Referring again to FIG. 11, one or more filters can be applied to items for a particular field to limit the information that is included in the data summary table 320. For example, the user can use drop down area 562 for a particular field listed in field pane 452 of task pane 450 to access a filtering task pane 700.

Figure 20:
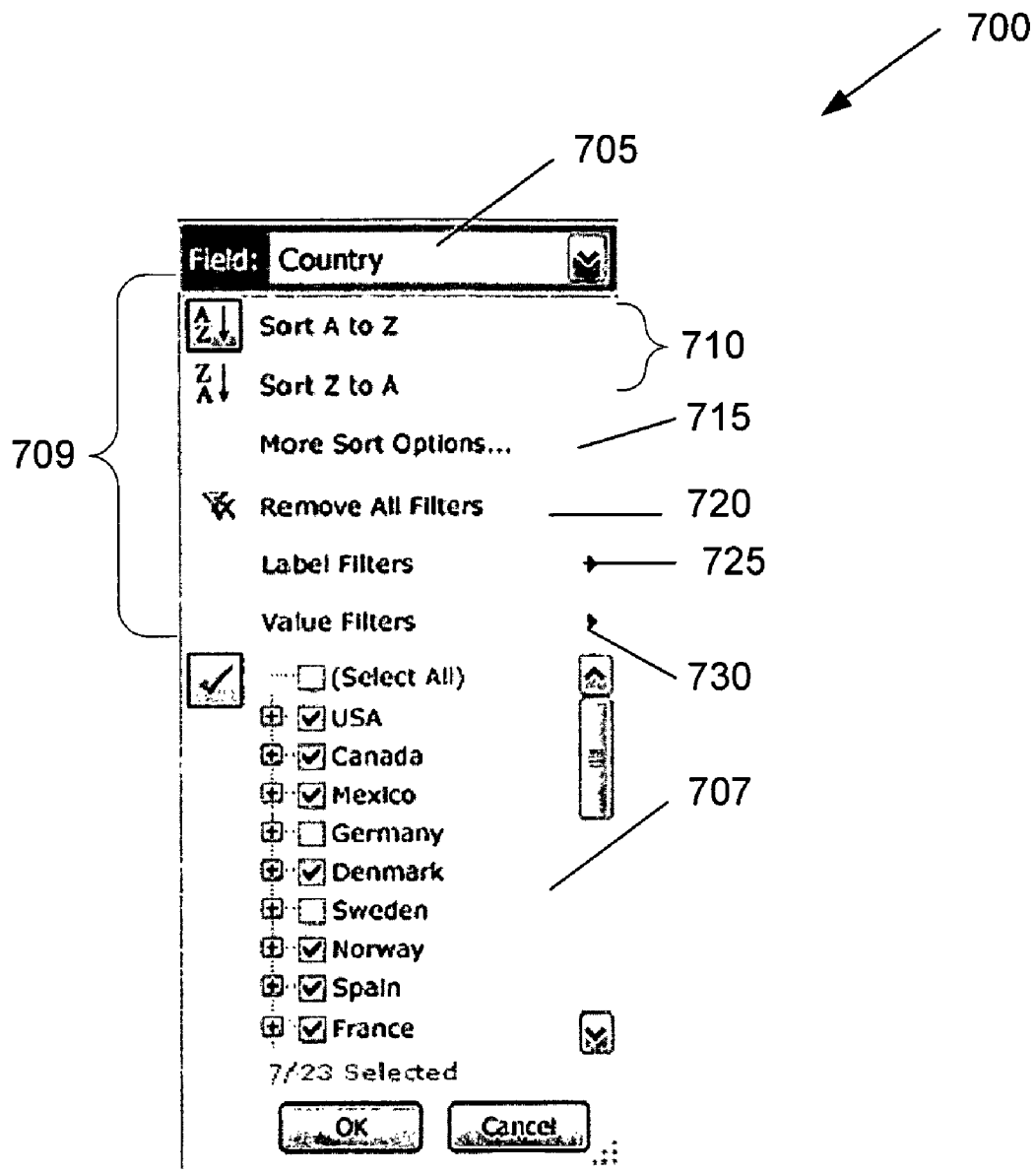
FIG. 20 illustrates an example filtering task pane.

Referring now to FIG. 20, example filtering task pane 700 is shown. Interface 700 generally includes a field selector drop down control 705, a manual filter area 707, and a filtering control area 709.

Selector drop down control 705 can be used to select different fields for filtering. For OLAP data, the fields in selector drop down control 705 can be displayed in a hierarchical arrangement, and drop down control 705 can be used to select different levels of OLAP data for filtering. In the example shown, the field selected is the "Country" field.

Figure 21:
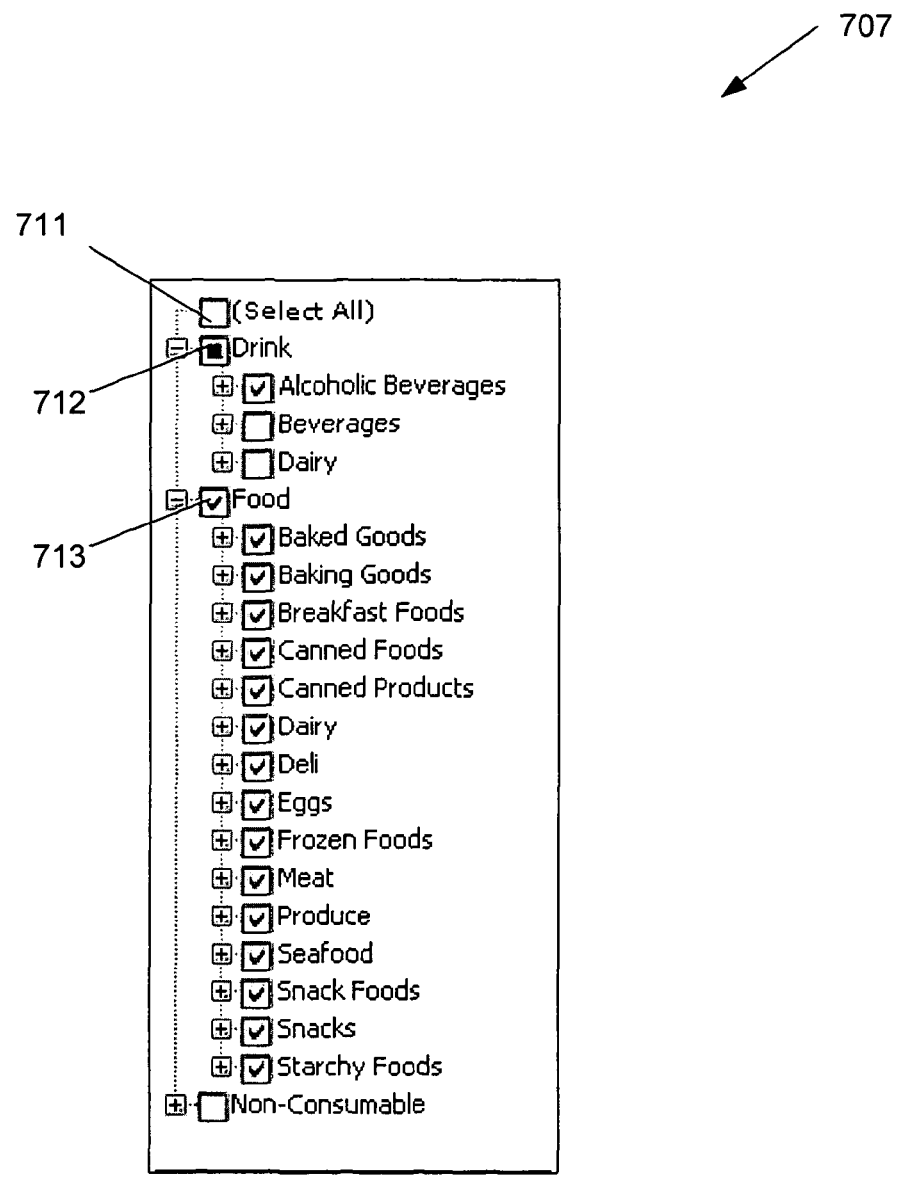
FIG. 21 illustrates an example manual filter area for another filtering task pane.

Manual filter area 707 lists all of the items associated with the field shown in selector drop down control 705. Checkboxes are associated with each item listed in manual filter area 707 to allow the user to manually select which items are included in the filter. Referring to FIG. 21, for OLAP data, sub-items can be accessed by clicking on the drill indicator plus/minus (+/−) sign to expand and collapse the items associated with each field listed in manual filter area 707. For example, the "Drink" and "Food" items are shown in expanded form. Checkbox 713 is selected for the "Food" item, which results in the selection of each sub-item of "Food" as well. For the "Drink" item, only sub-item "Alcoholic Beverages" is selected, and checkbox 712 associated with the "Drink" item is provided with a mix indicator to show that only a portion of sub-items of the "Drink" item are selected. A "select all" checkbox 711 can be selected to select/deselect every item at all levels shown in filter area 707.

Referring again to FIG. 20, when the user uses selector drop down control 705 to select a different field, manual filter area 707 is updated accordingly to list the items associated with the field shown in selector drop down control 705. If the newly selected field is from another level of the same hierarchy as the originally selected field in selector drop down control 705, manual filter area 707 remains unchanged because all levels of items are shown in manual filter area 707 for OLAP data.

Filtering control area 709 lists the filter controls that are available for application to the selected field shown in selector drop down control 705. Controls 710 allow the user to change the order in which filtered items are listed. For example, the user can select one of controls 710 to have the filtered items listed in alphabetic order from A→Z or from Z→A. Control 715 is used to provide additional sorting options, such as, for example, sorting by a particular field.

Figure 22:
FIG. 22 illustrates an example fly-out menu for the filtering task pane of FIG. 20.
Figure 23:
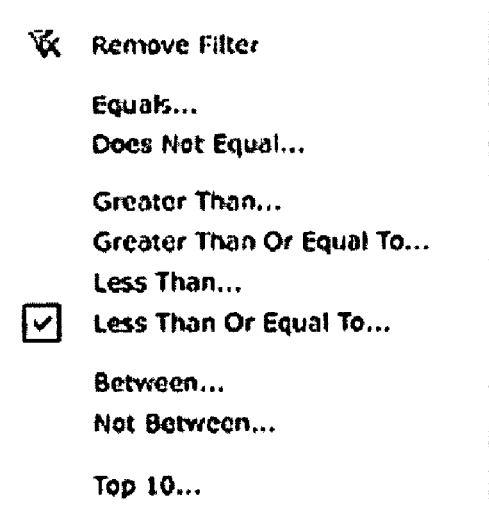
FIG. 23 illustrates another example fly-out menu for the filtering task pane of FIG. 20.

The user can select control 720 to remove all filtering for the field in drop down selector 705. Controls 725 and 730 allow the user to select particular filters to apply to the field in drop down selector 705. For example, if the user selects control 725, the user is presented with a fly-out menu 740, shown in FIG. 22. Menu 740 lists a plurality of filters that can be applied to the selected field. The filters listed in menu 740 are those filters that are typically applied to label fields. These filters include, without limitation, "Begins With," "Does Not Begin With," "Ends With," "Does Not End With," "Contains," and "Does Not Contain." The user can select a filter from menu 740 to apply that filter to the items in the field. Likewise, the user can select control 730 to access fly-out menu 745, shown in FIG. 23. Menu 745 includes filters that can be applied to value fields. These filters include, without limitation, "Equals," "Does Not Equal," "Greater Than," "Greater Than Or Equal To," "Less Than," "Less Than Or Equal To," "Between," and "Not Between."

Figure 24:
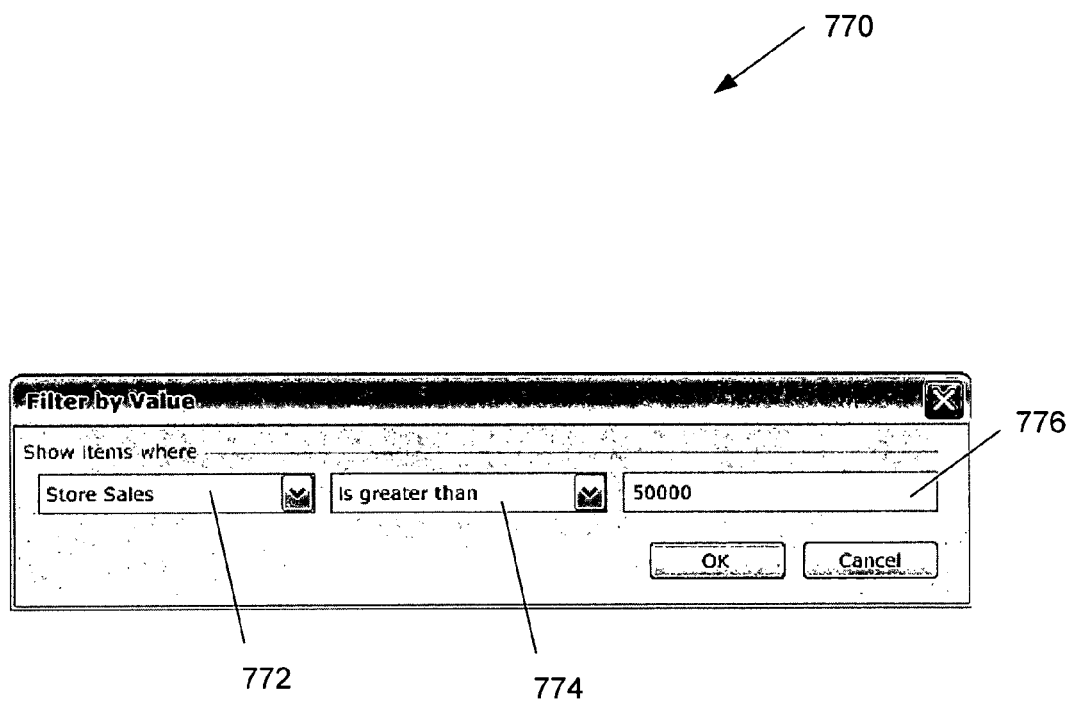
FIG. 24 illustrates an example dialog box for the filtering task pane of FIG. 20.

Referring now to FIG. 24, when the user selects a filter from one of the fly-outs 740, 745, the user is presented with a dialog box such as dialog box 760 to build the desired filter. In dialog box 760, a field selection box 772 is pre-populated with the with the selected field in selector drop down control 705, and a filter selection box 774 is pre-populated with the filter selected from fly-out 740, 745. The user can select a different field by selecting the drop down menu in field selection box 772 to, for example, access other fields currently included in value zone 457. The user can select a different filter by selecting the drop down menu in filter selection box 774, which provides a listing of all filters available for the data type. A criteria box 776 allows the user to place the value for filtering therein. For example, if the user selects the "Store Sales" item in manual filter area 707 and then selects the "Greater Than" filter from fly-out 745, dialog box 770 is presented to the user. The user can enter the value "50000" in criteria box 776 to set the filter to filter all Store Sales that are greater than $50,000.

Figure 25:
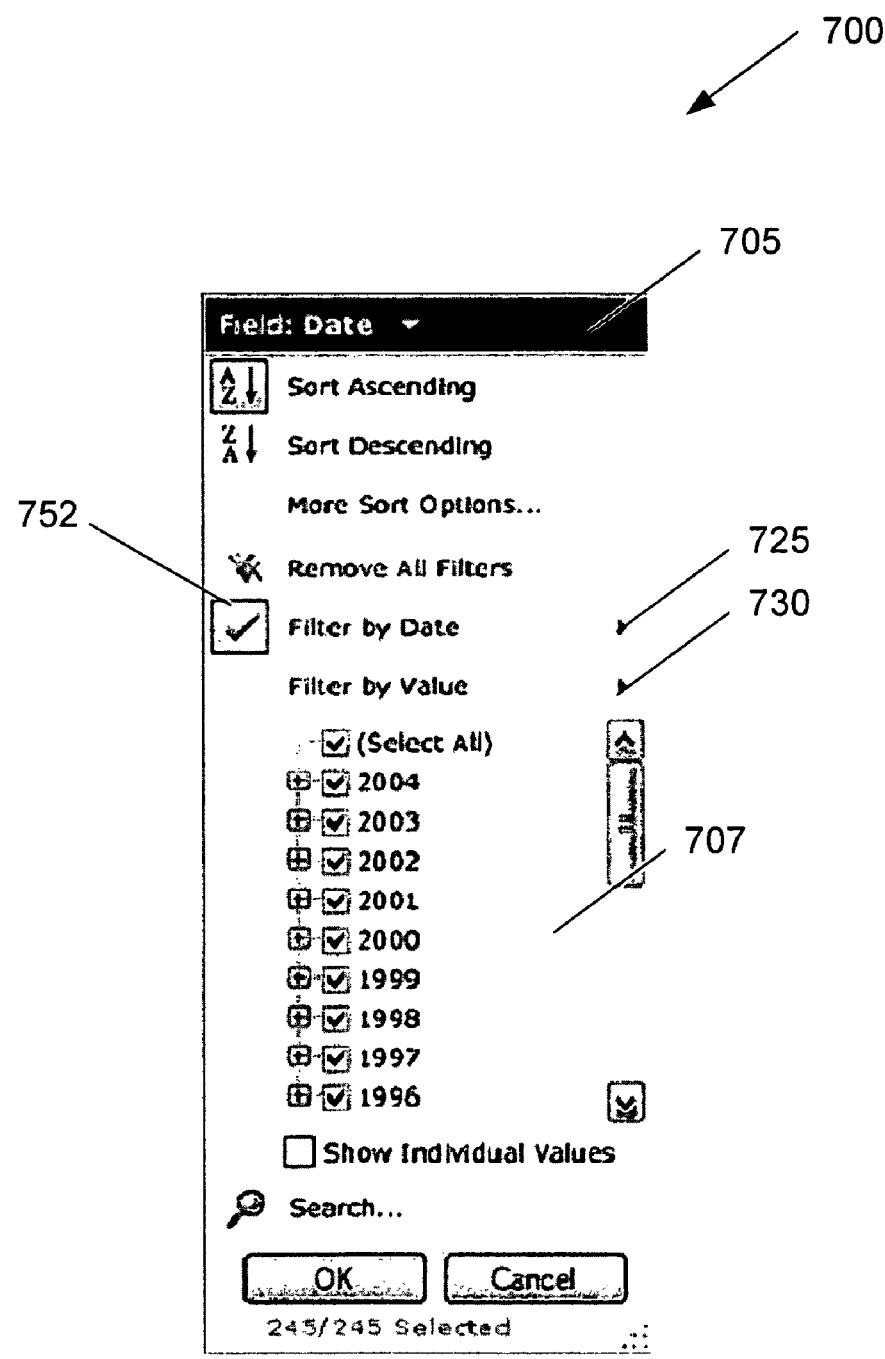
FIG. 25 illustrates another example filtering task pane.
Figure 26:
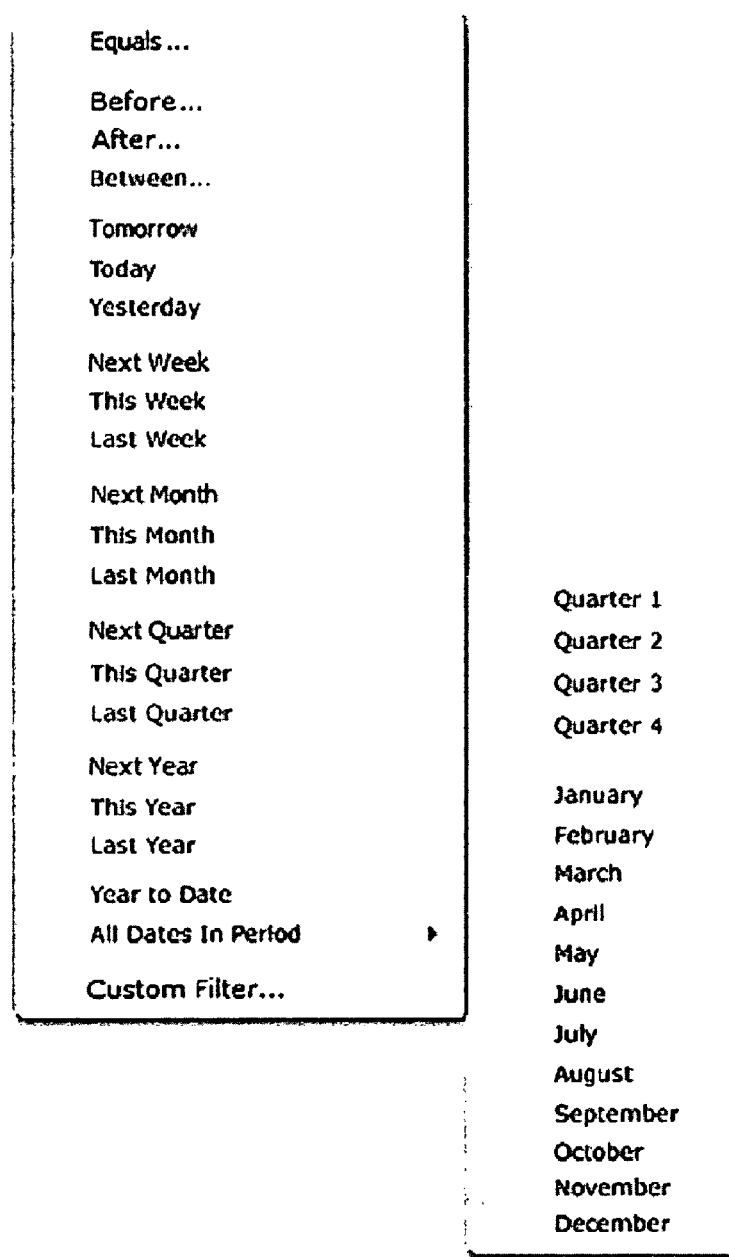
FIG. 26 illustrates an example fly-out menu for the filtering task pane of FIG. 25.

Referring now to FIG. 25, controls 725 and 730 can be modified depending upon the type of field shown in selector drop down control 705. For example, task pane 700 includes a field of the date type and therefore includes control 725 that allows for filtering by date, and control 730 that allows for filtering by value. The user can select control 725 to access fly-out menu 760 shown in FIG. 26. Fly-out menu 760 includes a plurality of filters that can be applied to a field of data type.

In some embodiments, the user is presented with only those controls that are applicable to a selected field. For example, if the user selects a field of non-date and non-numeric type, control 725 is active to provide fly-out menu 740 with filters applicable to such a field. If the user selects a date field, control 725 is active to provide fly-out menu 760 with filters applicable to date fields. If the user selects a field of numeric, non-date type, control 730 is active to provide fly-out menu 745 with filters applicable to numeric data fields.

In some embodiments, filters can be associated with a given field before the field is added to the data summary table 320. The filter is actually applied when the particular field is added to the data summary table 320. In this manner, the amount of data that is accessed and summarized on data summary table 320 can be reduced, thereby increasing efficiency. If a filter is applied to a field that is already included in data summary table 320, data summary table 320 is updated in view of the filter to show only the filtered items.

Additional details regarding the application of the selected filters to the data is found in U.S. patent application Ser. No. 11/157,634, filed on Jun. 21, 2005 and entitled "Dynamically Filtering Aggregate Reports Based on Values Resulting from One or More Previously Applied Filters," the entirety of which is hereby incorporated by reference.

Figure 27:
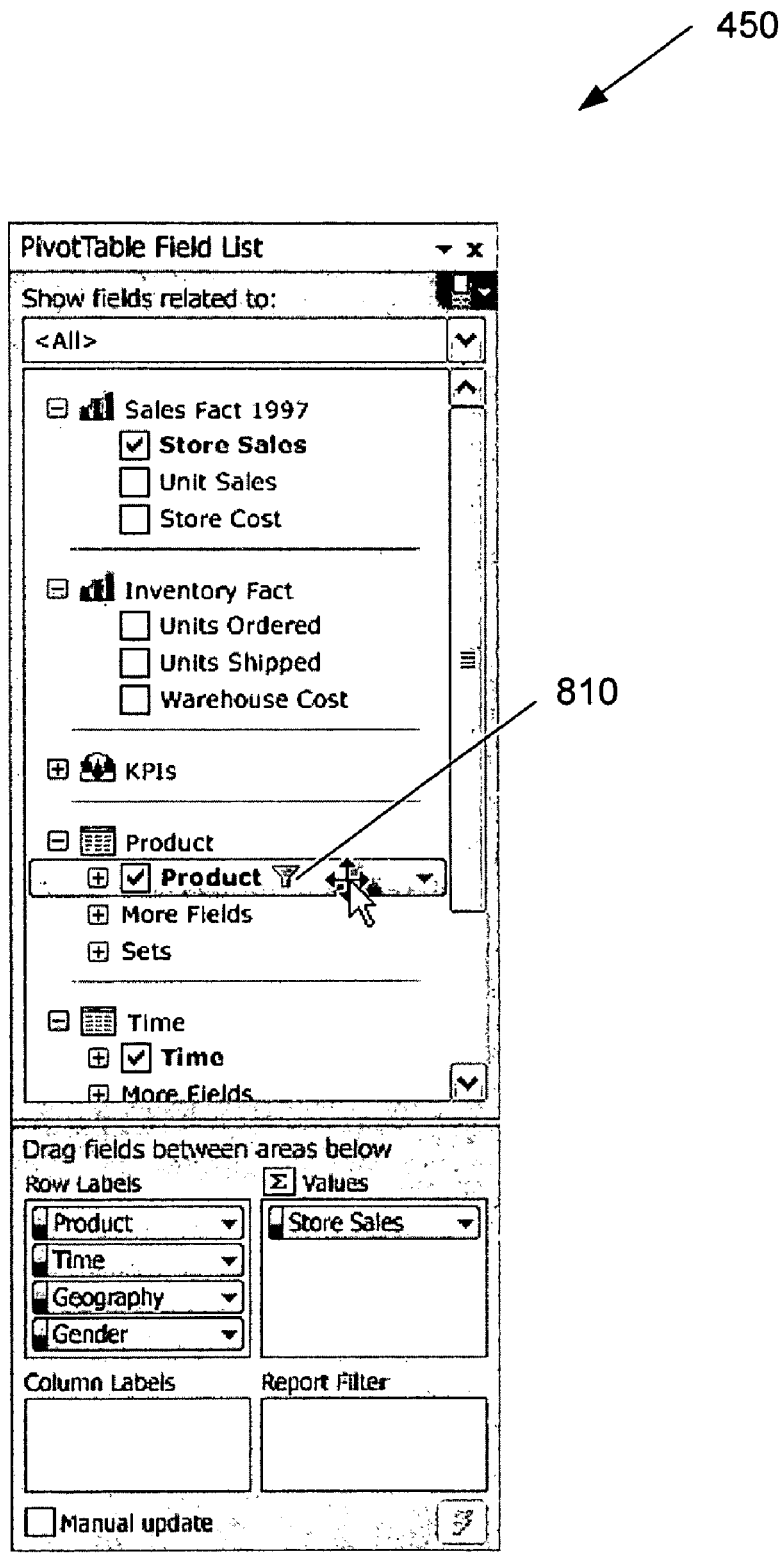
FIG. 27 illustrates another example task pane.

A checkbox indicator 752 (see FIG. 25) in filtering pane 700 is placed adjacent to any filters that have been applied. Referring now to FIG. 27, once a filter is applied to a given field, a filter icon 810 is shown adjacent to the field in field pane 452 of task pane 450 to indicate that a filter is applied to the field. In some embodiments, a similar filter icon is also associated with each filtered field in layout pane 454 and in data summary table 320.

Figure 28:
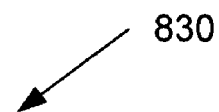
FIG. 28 illustrates an example tool-tip for the task pane of FIG. 27.

In addition, when the pointing device hovers over the particular field with filter icon 810, a tool-tip 830 is provided, as shown in FIG. 28. Tool-tip 830 lists the filtered fields in one of three sections, manual filters, label filters, and value filters. Tool-tip 830 also lists the filtered fields in the order of evaluation with the type of filter applied. For filters with longer labels, a portion of the label can be truncated as required to fit within the tool-tip. For each filter, tool-tip 830 shows that a manual filter is first applied to the "Year" field for years 2000, 2001, 2002, 2003, and 2004. Tool-tip 830 indicates that a text filter is then applied to the "Product Name" field, requiring the text "ab." Additional filtering is also shown in tool-tip 830. In this manner, the user can identify which filters are applied for the data summary table 320, and can also identify the order in which the filters are applied by examining tool-tip 830.

In the example shown, the user can use drop down area 562 (see FIG. 11) for a particular field listed in task pane 450 to access filtering task pane 700. If the user accesses interface 700 from data summary table 320, the default field shown in selector drop down control 705 is the field that is currently selected in data summary table 320. The user can select another field using selector drop down control 705. In other embodiments, filtering task pane 700 can also be accessed from within data summary table 320 by selecting drop down areas 862 in data summary table 320. See FIG. 9. In other embodiments, the user can access filtering task pane 700 by selecting one or more fields in data summary table 320 and right-clicking on the selected fields to access one or more filtering options. These options can include, for example, including or excluding the selected fields in a manual filter, or filtering the selected fields using the label, date, or value filters describe above.

If filtering task pane 700 is accessed from data summary table 320, the fields listed in drop down control 705 can be selected based on where the user accesses interface 700. For example, if the user selects drop down area 862 from a field in a row of data summary table 320, all fields currently on rows are shown. If the user instead selects drop down area 862 from a field in a column of data summary table 320, all fields currently on columns are shown.

In the example shown, filtering information is stored with the particular field to which it is applied. For example, if filtering is applied to a field that is not part of data summary table 320, the filtering information is associated with the field and applied when the field is added to data summary table 320. Likewise, if a field with a filter is removed from data summary table 320, the filter information is retained with the field so that if the field is later added back to data summary table 320, the filter is reapplied. As noted above, filtering for a field can be removed by selecting the field and then selecting control 720 (see FIG. 20).

The various embodiments described above are provided by way of illustration only and should not be construed as limiting. Those skilled in the art will readily recognize various modifications and changes that may be made without following the example embodiments and applications illustrated and described herein, and without departing from the true spirit and scope of the present invention, which is set forth in the following claims.

The invention claimed is:

1. A computer system, comprising:
a processor unit; and
a computer-readable storage medium storing instructions that, when executed by the processor unit, cause the processor unit to create a graphical user interface of an application for creating a data summary table, the user interface comprising:
a data summary table; and
a task pane separate from the data summary table, the task pane comprising:
a field pane including a list of a plurality of fields, and
a layout pane comprising a rows zone and a columns zone;
the application configured to:
receive a selection of a first field from the plurality of fields;
receive a selection of a first filter option available to the first field;
in response to the selection of the first filter option:
associate a first filter option with the first field; and
generate a first filtered value based on the first filter option;
receive an indication that the first field is dragged and dropped into the rows zone;
in response to the indication that the first field is dropped into the rows zone, display the first filtered value as a row label in the data summary table;
receive a selection of a second field from the plurality of fields;
receive a selection of a second filter option available to the second field;
in response to the selection of the second filter option:
associate a second filter option with the second field; and
generate a second filtered value based on the second filter option;
receive an indication that the second field is dragged and dropped into the columns zone; and
in response to the indication that the second field is dropped into the columns zone, display the second filtered value as a column label in the data summary table;
wherein the application is further configured to:
receive a selection of a control;
automatically determine a data type of a field associated with the control;
automatically place the field into the values zone based on the data type of field; and
display a value of the field as a value in the data summary table.

2. The computer system of claim 1, wherein the filtering pane further comprises a manual filtering area programmed to list a plurality of items in the first field.

3. The computer system of claim 2, wherein the filtering pane further comprises a plurality of checkboxes, one checkbox being associated with each of the items in the manual filtering area.

4. The computer system of claim 3, wherein the application is further configured to:
receive a selection of a checkbox;
automatically determine a data type of a field associated with the checkbox;
automatically place the field into the rows zone based on the data type; and
display a value of the field as a row label in the data summary table.

5. The computer system of claim 3, wherein the application is further configured to:
receive a selection of a checkbox;
automatically determine a data type of a field associated with the checkbox;

automatically place the field into the columns zone based on the data type of field; and display a value of the field as a column label in the data summary table.

6. The computer system of claim 5, wherein the type of field is a date.

7. The computer system of claim 3, wherein the control is a checkbox.

8. In a computer system having a graphical user interface of an application for defining a data summary table, a method comprising:

presenting a task pane separate from the data summary table, the task pane including:
a field pane comprising a list of the plurality of fields associated with one or more field controls; and
a layout pane comprising a plurality of zones programmed to allow one or more of the plurality of fields to be dragged from the field pane and dropped into one or more of the plurality of zones to modify the data summary table;

presenting a plurality of filtering options for the first field, the filtering options having filtering criteria specific to a data type of the first field, the filtering criteria being divided into at least two controls including:
a label filter control providing one or more filters that are applied to labels, and
a value filter control including one or more filters that are applied to values;

receiving a selection of a first filtering option available to the first field;

associating the first filtering option with the first field;

filtering items in the first field according to the first filtering option, the filtering generating a first filtered value;

receiving a selection of a first control associated with the first field;

in response to the selection of the first control:
determining a first data type of the first field;
automatically placing the first field into the columns zone; and
displaying the first filtered value associated with the first field as a column label in the data summary table;

receiving a selection of a second filtering option available to the second field;

associating the second filtering option with the second field;

filtering items in the second field according to the second filtering option, the filtering generating a second filtered value;

receiving a selection of a second control associated with the second field;

in response to the selection of the second control:
determining a second type of the second field;
automatically placing the second field into the rows zone; and
displaying the second filtered value associated with the second field as a row label in the data summary table;

receiving a selection of a third control associated with a third field;

in response to the selection of the third control:
determining a third type of the third field;
automatically placing the third field into the values zone; and
displaying a value associated with the third field in the data summary table.

9. The method of claim 8, further comprising:
removing the first field from the data summary table;
thereafter, adding the first field to the data summary table; and
applying the selected filtering to the items in the first field when the first field is added to the data summary table.

10. The method of claim 8, further comprising providing a manual filtering area programmed to list a plurality of the items in a field of the plurality of fields.

11. The method of claim 8, wherein the first control is a checkbox.

12. The method of claim 8, further comprising:
receiving a selection of a third control associated with a third field;
in response to the selection of the third control:
determining a third data type of the third field;
automatically placing the third field into the columns zone based on the third data type; and
displaying a value associated with the third field as a column label in the data summary table.

13. The method of claim 12, wherein the third data type is a date.

14. The method of claim 8, wherein the second data type is a zip code.

15. A computer-readable storage medium having computer-executable instructions stored thereon for performing steps comprising:

presenting a task pane separate from a data summary table in a graphical user interface of an application, the task pane including:
a field pane comprising a list of the plurality of fields; and
a layout pane comprising a plurality of zones allowing one or more of the plurality of fields to be dragged from the field pane and dropped into one or more of the plurality of zones to modify the data summary table;

the application configured to:
receive a selection of a first field from the plurality of fields;
receive a selection of a first filter option available to the first field;
in response to the selection of the first filter option:
associate a first filter option with the first field; and
generate a first filtered value based on the first filter option;
receive an indication that the first field is dragged and dropped into a rows zone;
in response to the indication that the first field is dropped into the rows zone, display the first filtered value as a row label in the data summary table;
receive a selection of a second field from the plurality of fields;
receive a selection of a second filter option available to the second field;
in response to the selection of the second filter option:
associate a second filter option with the second field;
generate a second filtered value based on the second filter option;
receive an indication that the second field is dragged and dropped into a columns zone; and
in response to the indication that the second field is dropped into the columns zone, display the second filtered value as a column label in the data summary table;

wherein the application is further configured to:
  receive a selection of a control;
  automatically determine a data type of a field associated with the control;
  automatically place the field into the values zone based on the data type of field; and
  display a value of the field as a value in the data summary table.

16. The computer-readable storage medium of claim 15, further comprising:
  allowing selection of a second field in the data summary table data display;
  presenting second filtering options for the second field; and
  applying second filtering to items in the second field in the data summary table.

17. The method of claim 15, wherein a first control displayed in the layout pane is associated with the first field.

18. The method of claim 17, further comprising:
  receiving a selection of the first control associated with the first field; and
  in response to the selection of the first control:
    determining a data type of the first field;
    automatically placing the first field into the rows zone based on the first data type; and
    displaying a value associated with the first field as a row label in the data summary table.

19. The method of claim 18, wherein the data type is a zip code.

20. The method of claim 15, wherein a second control displayed in the layout pane is associated with the second field.

* * * * *